US012749628B2

(12) United States Patent
Kim et al.

(10) Patent No.: US 12,749,628 B2
(45) Date of Patent: Sep. 29, 2026

(54) MULTILAYER ELECTRONIC COMPONENT INCLUDING INTERNAL ELECTRODE HAVING NICKEL AND INDIUM

(71) Applicant: SAMSUNG ELECTRO-MECHANICS CO., LTD., Suwon-si (KR)

(72) Inventors: Jun Oh Kim, Suwon-si (KR); Sung Hwan Lee, Suwon-si (KR); No Jun Kwak, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 355 days.

(21) Appl. No.: 18/394,032

(22) Filed: Dec. 22, 2023

(65) Prior Publication Data

US 2024/0249886 A1 Jul. 25, 2024

(30) Foreign Application Priority Data

Jan. 19, 2023 (KR) ........................ 10-2023-0008272
Feb. 3, 2023 (KR) ........................ 10-2023-0015116

(51) Int. Cl.
*H01G 4/30* (2006.01)
*H01G 4/008* (2006.01)
*H01G 4/012* (2006.01)

(52) U.S. Cl.
CPC ............. *H01G 4/30* (2013.01); *H01G 4/0085* (2013.01); *H01G 4/012* (2013.01)

(58) Field of Classification Search
CPC ......... H01G 4/30; H01G 4/012; H01G 4/0085
See application file for complete search history.

(56) References Cited

U.S. PATENT DOCUMENTS

2004/0233612 A1* 11/2004 Sugimoto ................ H01G 4/30 361/312
2011/0141655 A1* 6/2011 Jeong ..................... H01G 4/005 361/306.3

(Continued)

FOREIGN PATENT DOCUMENTS

JP 2006041268 A * 2/2006
JP 5488725 B2 5/2014

(Continued)

OTHER PUBLICATIONS

Office Action issued on Oct. 22, 2025 in the corresponding Japanese Patent Application No. 2023-221251 with English translation.

(Continued)

*Primary Examiner* — David M Sinclair
(74) *Attorney, Agent, or Firm* — Morgan, Lewis & Bockius LLP

(57) ABSTRACT

A multilayer electronic component includes a body including a plurality of dielectric layers and a plurality of internal electrodes alternately disposed with the plurality of dielectric layers in a first direction, and an external electrode disposed on the body. One of the plurality of internal electrodes includes Ni and In. In the one of the plurality of internal electrodes, among points 10 nm away from an interface with one of the plurality of dielectric layers, a ratio of points at which a molar ratio of In/(Ni+In) is 0.002 or more is 70% or more, and among central points in the first direction, a ratio of points at which the molar ratio of In/(Ni+In) is 0.002 or more is 35% or less.

30 Claims, 12 Drawing Sheets

(56) References Cited

U.S. PATENT DOCUMENTS

| | | | | |
|---|---|---|---|---|
| 2013/0321980 | A1 | 12/2013 | Suzuki et al. | |
| 2015/0155098 | A1 | 6/2015 | Yamaguchi et al. | |
| 2016/0155571 | A1 * | 6/2016 | Doi | H01G 4/12 156/89.16 |
| 2016/0276102 | A1 | 9/2016 | Suzuki et al. | |
| 2016/0358713 | A1 | 12/2016 | Doi et al. | |
| 2018/0240592 | A1 * | 8/2018 | Morita | H01G 4/30 |
| 2019/0304695 | A1 | 10/2019 | Kim et al. | |
| 2021/0202177 | A1 * | 7/2021 | Kurosu | H01G 4/008 |
| 2022/0165502 | A1 * | 5/2022 | Iguchi | H01G 4/005 |
| 2022/0301770 | A1 | 9/2022 | Lee et al. | |
| 2023/0005664 | A1 | 1/2023 | Kang et al. | |
| 2023/0207211 | A1 | 6/2023 | Oh et al. | |

FOREIGN PATENT DOCUMENTS

| | | | |
|---|---|---|---|
| JP | 5892252 | B2 | 3/2016 |
| JP | 6197879 | B2 | 9/2017 |
| JP | 6558083 | B2 | 8/2019 |
| JP | 2019-176117 | A | 10/2019 |
| JP | 2022-146866 | A | 10/2022 |
| KR | 10-2020-0044767 | A | 4/2020 |
| KR | 10-2023-0099932 | A | 7/2023 |
| WO | 2015/087688 | A1 | 6/2015 |

OTHER PUBLICATIONS

Extended European Search Report dated Dec. 12, 2024 issued in the corresponding European Patent Application No. 24151136.9.

Office Action issued on Nov. 26, 2024 in the corresponding Japanese Patent Application No. 2023-221251 with English translation.

* cited by examiner

MULTILAYER ELECTRONIC COMPONENT INCLUDING INTERNAL ELECTRODE HAVING NICKEL AND INDIUM

CROSS-REFERENCE TO RELATED APPLICATION (S)

This application claims benefit of priority to Korean Patent Application No. 10-2023-0015116 filed on Feb. 3, 2023 and Korean Patent Application No. 10-2023-0008272 filed on Jan. 19, 2023 in the Korean Intellectual Property Office, the disclosures of which are incorporated herein by reference in their entirety.

TECHNICAL FIELD

The present disclosure relates to a multilayer electronic component.

A Multilayer Ceramic Capacitor (MLCC), a multilayer electronic component, is a chip-type condenser mounted on printed circuit boards of various electronic products, for example, video devices such as liquid crystal displays (LCDs), plasma display panels (PDPs) and the like, computers, smartphones, and mobile phones, serving to charge or discharge electricity therein.

Multilayer ceramic capacitors may be used as components in various electronic devices due to having a small size, high capacitance, and ease of installation. As various electronic devices such as computers and mobile devices are miniaturized and have higher output, demand for miniaturization and higher capacitance for multilayer ceramic capacitors is increasing.

In accordance with the trend for miniaturization and high capacitance of multilayer ceramic capacitors, the importance of increasing capacitance per unit volume of multilayer ceramic capacitors is increasing. To obtain miniaturization and high capacitance of a multilayer ceramic capacitor, the thickness of the dielectric layer and internal electrode should be reduced to increase the number of stacks. Additionally, to improve reliability of a multilayer ceramic capacitor, the connectivity of the internal electrodes should be high and the thickness of the internal electrodes should be uniform.

However, when using a finer metal powder than previously, to reduce the thickness of the internal electrode, the sintering shrinkage initiation temperature is lowered, and as the discrepancy in shrinkage behavior with the dielectric layer increases, internal electrode agglomeration and internal electrode breakage may occur.

In addition, as application to automotive electrical components and the like increases, high reliability in various environments may be required. To ensure high reliability, it may be important to disperse the concentration of the electric field by improving the connectivity and thickness uniformity of the internal electrodes. Additionally, to ensure high reliability in various environments, excellent high-temperature load lifespan may be required.

On the other hand, there was an attempt to solve the above-mentioned problems by adding Sn to the internal electrode paste and disposing a region with high Sn content at the interface between the dielectric layer and the internal electrode. However, in this case, problems such as reduced capacitance, increased distribution of capacitance, and increased distribution of insulation resistance may occur.

SUMMARY

An aspect of the present disclosure is to provide a multilayer electronic component having relatively high reliability.

An aspect of the present disclosure is to provide a multilayer electronic component having improved capacitance.

An aspect of the present disclosure is to provide a multilayer electronic component having excellent high temperature load lifespan.

An aspect of the present disclosure is to suppress a phenomenon of internal electrode agglomeration and internal electrode disconnection.

An aspect of the present disclosure is to improve a distribution of capacitance and grain size.

An aspect of the present disclosure is to improve a distribution of insulation resistance.

According to an aspect of the present disclosure, a multilayer electronic component includes a body including a plurality of dielectric layers and a plurality of internal electrodes alternately disposed with the plurality of dielectric layers in a first direction; and an external electrode disposed on the body. One of the plurality of internal electrodes includes Ni and In. In the one of the plurality of internal electrodes, among points 10 nm away from an interface with one of the plurality of dielectric layers, a ratio of points at which a molar ratio of In/(Ni+In) is 0.002 or more is 70% or more, and among central points in the first direction, a ratio of points at which the molar ratio of In/(Ni+In) is 0.002 or more is 35% or less.

According to an aspect of the present disclosure, a multilayer electronic component includes a body including a plurality of dielectric layers and a plurality of internal electrodes alternately disposed with the plurality of dielectric layers in a first direction; and an external electrode disposed on the body. One of the plurality of internal electrodes includes Ni and In. In the one of the plurality of internal electrodes, an average value of a molar ratio of In/(Ni+In) at points 2 nm away from an interface with one of the plurality of dielectric layers is X, and an average value of a molar ratio of In/(Ni+In) in regions 10 nm apart from the interface with the one of the plurality of dielectric layers is Y, and X−Y is greater than or equal to 0.0041.

According to an aspect of the present disclosure, a multilayer electronic component includes a body including a plurality of dielectric layers and a plurality of internal electrodes alternately disposed with the plurality of dielectric layers in a first direction; and an external electrode disposed on the body. One of the plurality of internal electrodes includes Ni and In. In the one of the plurality of internal electrodes, a ratio of points at which a molar ratio of In/(Ni+In) is 0.002 or more among points 10 nm away from an interface with one of the plurality of dielectric layers is 50% or more, as compared to a ratio of points at which the molar ratio of In/(Ni+In) is 0.002 or more among central points in the first direction.

According to an aspect of the present disclosure, a multilayer electronic component includes a body including a plurality of dielectric layers and a plurality of internal electrodes alternately disposed with the plurality of dielectric layers in a first direction; and an external electrode disposed on the body. One of the plurality of internal electrodes includes Ni and In. A content of In with respect to a content of Ni in a first region of the one of the plurality of internal electrodes is greater than a content of In with respect to a content of Ni in a central region of the one of the plurality of internal electrodes in the first direction, the first region being disposed between the central region of the one of the plurality of internal electrodes and an interface between the one of the plurality of internal electrodes and one of the plurality of dielectric layers. The body has a first surface and a second surface opposing in the first direction, a third surface and a fourth surface connected to the first and second surfaces and opposing in a second direction, and a fifth surface and a sixth surface connected to the first to fourth surfaces and opposing in a third direction. The body includes a capacitance forming portion including the plurality of internal electrodes, and a cover portion disposed on both end surfaces of the capacitance forming portion in the first direction, and margin portions disposed on both end surfaces of the capacitance forming portion in the third direction. 1<Gc/Ga and 1<Gm/Ga are satisfied, in which Gc is an average grain size of dielectric crystal grains included in the cover portion, Ga is an average grain size of dielectric crystal grains included in the dielectric layer of the capacitance forming portion, and Gm is an average grain size of dielectric crystal grains included in the margin portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
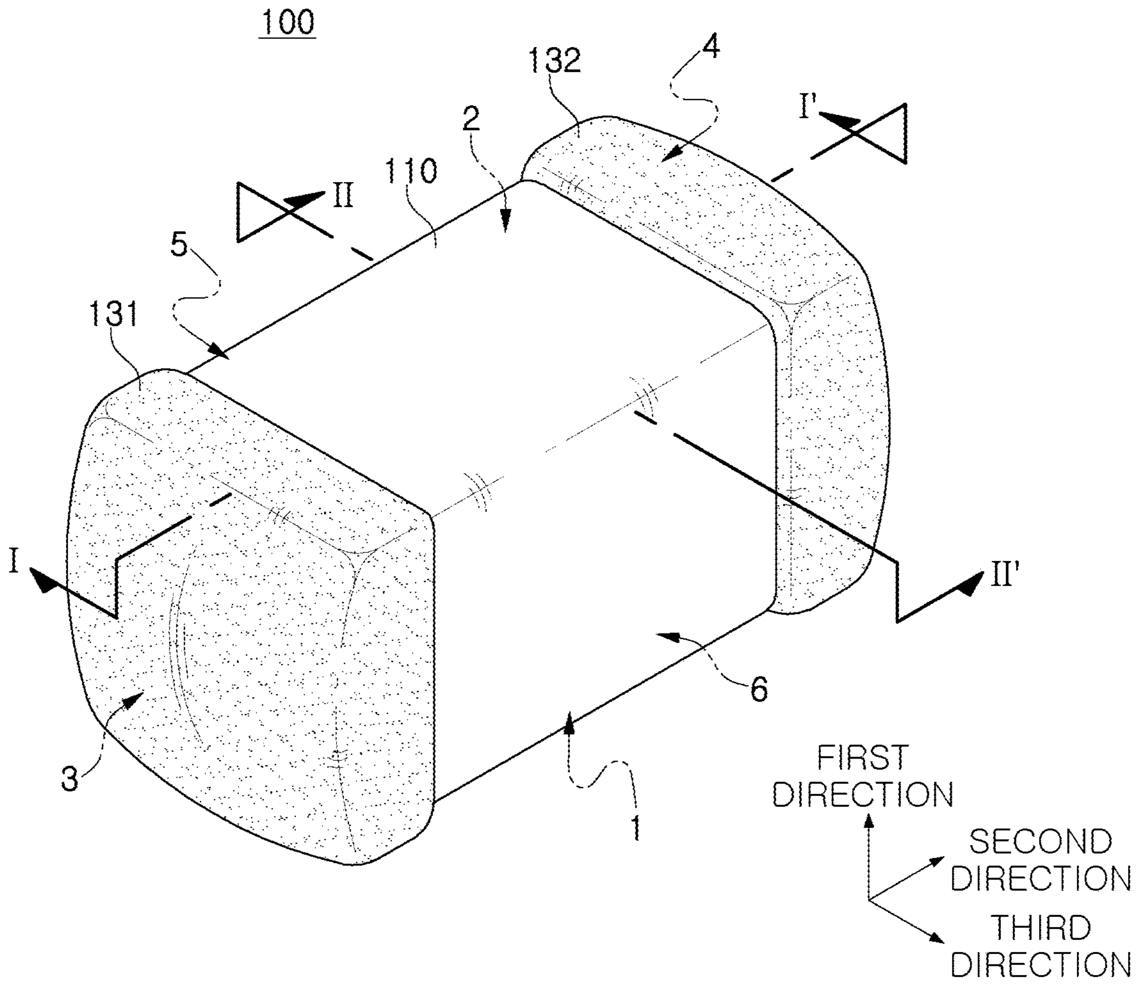
FIG. 1 schematically illustrates a perspective view of a multilayer electronic component according to an embodiment.

Hereinafter, embodiments of the present disclosure will be described with reference to detailed embodiments and the accompanying drawings. However, the embodiment may be modified in various other forms, and the scope of the present disclosure is not limited to the embodiments described below. Further, the embodiments of the present disclosure are provided to describe the present disclosure in more detail to those skilled in the art. Accordingly, the shapes and sizes of elements in the drawings may be exaggerated for a clearer understanding, and elements indicated by the same reference numerals in the drawings are the same elements.

To clearly illustrate the present disclosure in the drawings, portions irrelevant to the description are omitted, and the size and thickness of respective components illustrated in the drawings are arbitrarily indicated for convenience of description, so the present disclosure is not necessarily limited to the illustration. In addition, components having the same function within the scope of the same concept will be described using the same reference numerals. Furthermore, throughout the specification, when a part "includes" a certain element, it means that other elements may be further included, rather than excluding other elements, unless otherwise stated.

In the drawings, the first direction may be defined as the stacking direction or thickness (T) direction, the second direction may be defined as the length (L) direction, and the third direction may be defined as the width (W) direction.

Multilayer Electronic Component

FIG. 1 schematically illustrates a perspective view of a multilayer electronic component according embodiment.

Figure 2:
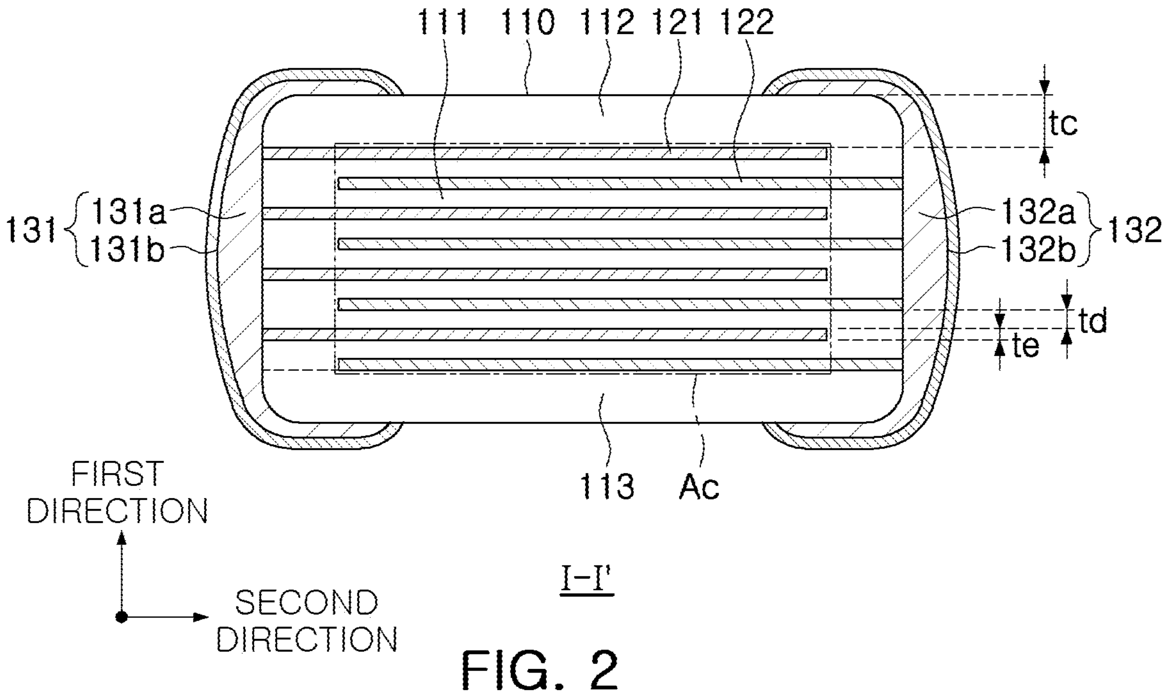
FIG. 2 schematically illustrates a cross-sectional view taken along line I-I' of FIG. 1.

FIG. 2 schematically illustrates a cross-sectional view taken along line I-I' of FIG. 1.

Figure 3:
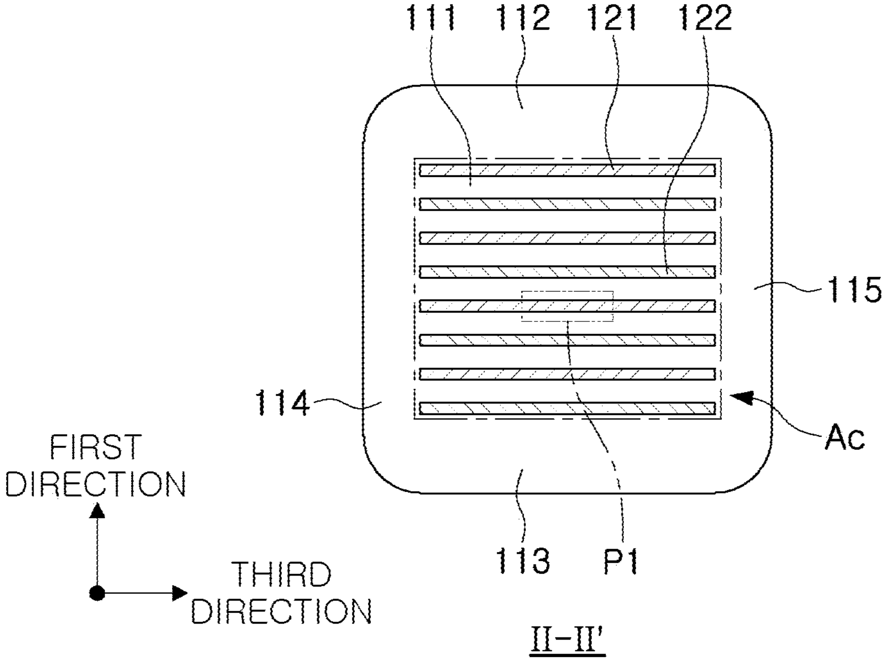
FIG. 3 schematically illustrates a cross-sectional view taken along line II-II' of FIG. 1.

FIG. 3 schematically illustrates a cross-sectional view taken along line II-II' of FIG. 1.

Figure 4:
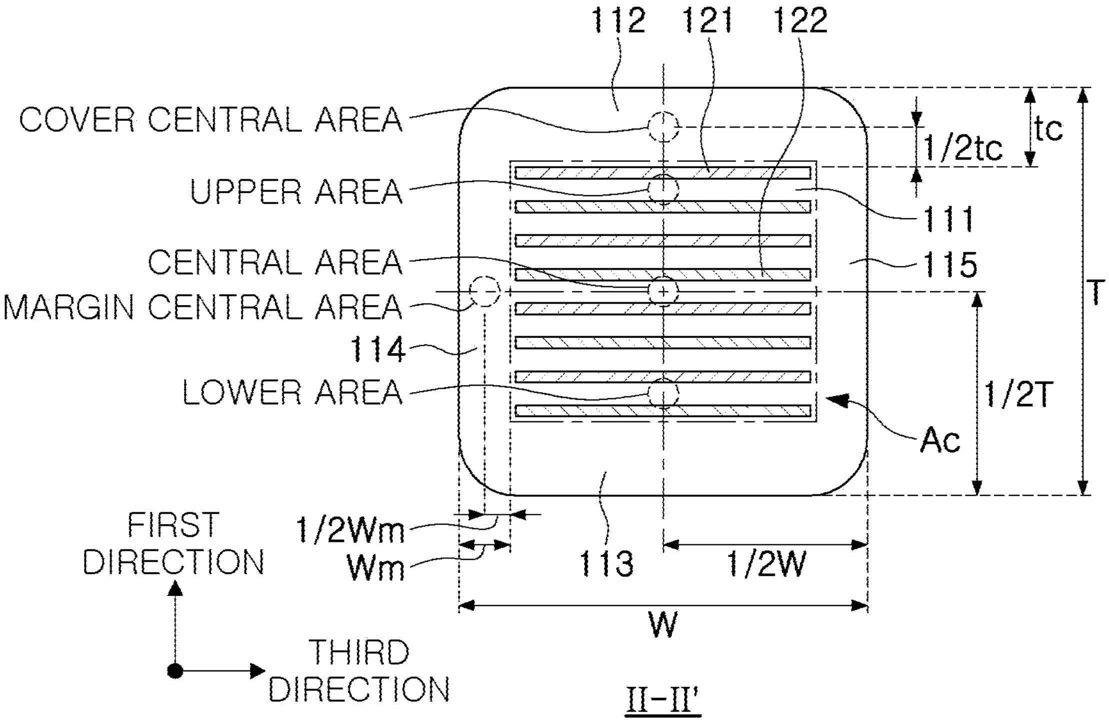
FIG. 4 is a cross-sectional view taken along line II-II' of FIG. 1 and illustrating a measurement area of the present disclosure.

FIG. 4 is a cross-sectional view taken along line II-II' of FIG. 1 to illustrate a measurement area of the present disclosure.

Figure 5:
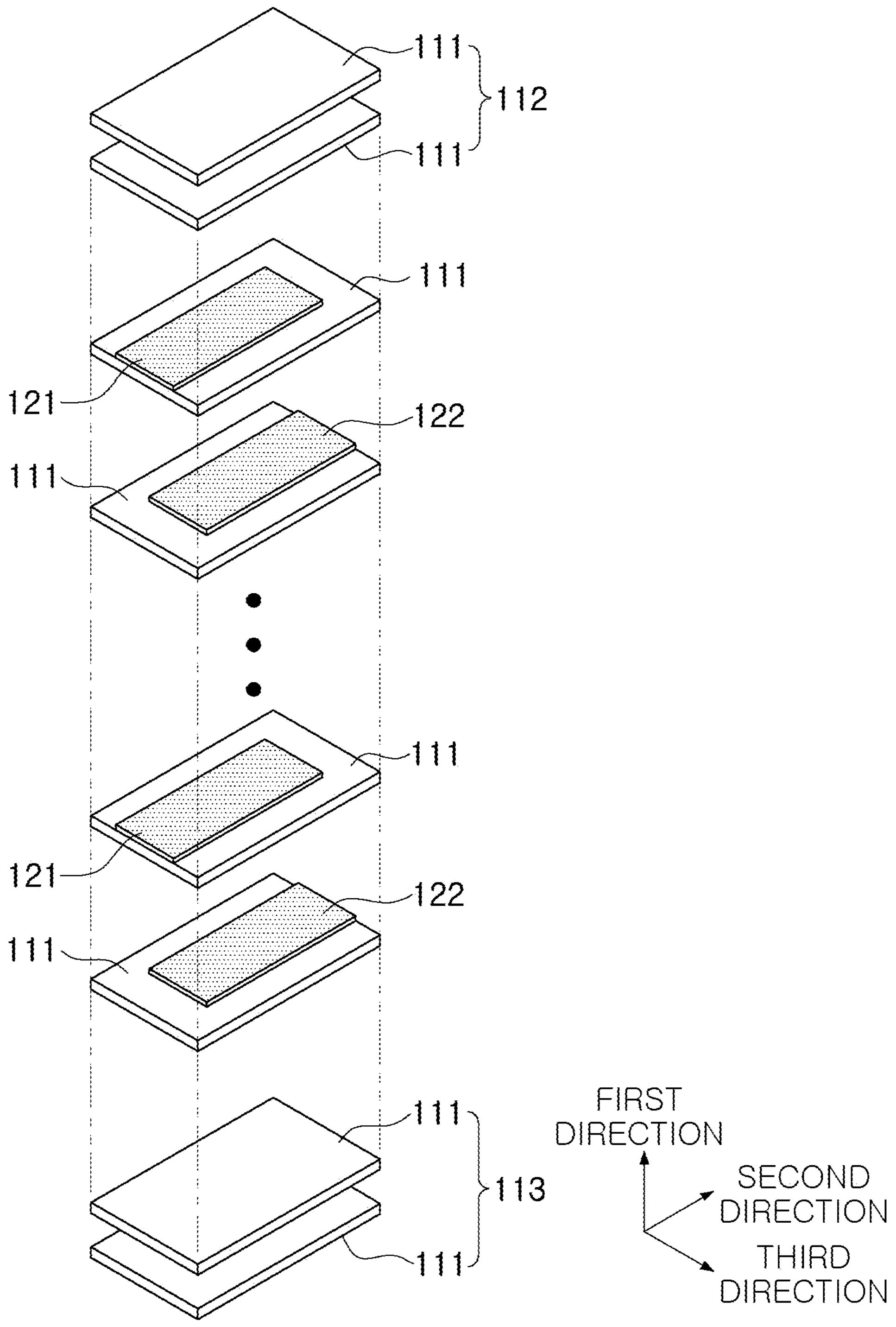
FIG. 5 is an exploded perspective view illustrating a body of FIG. 1 disassembled.

FIG. 5 is an exploded perspective view illustrating a body of FIG. 1 disassembled.

Figure 6:
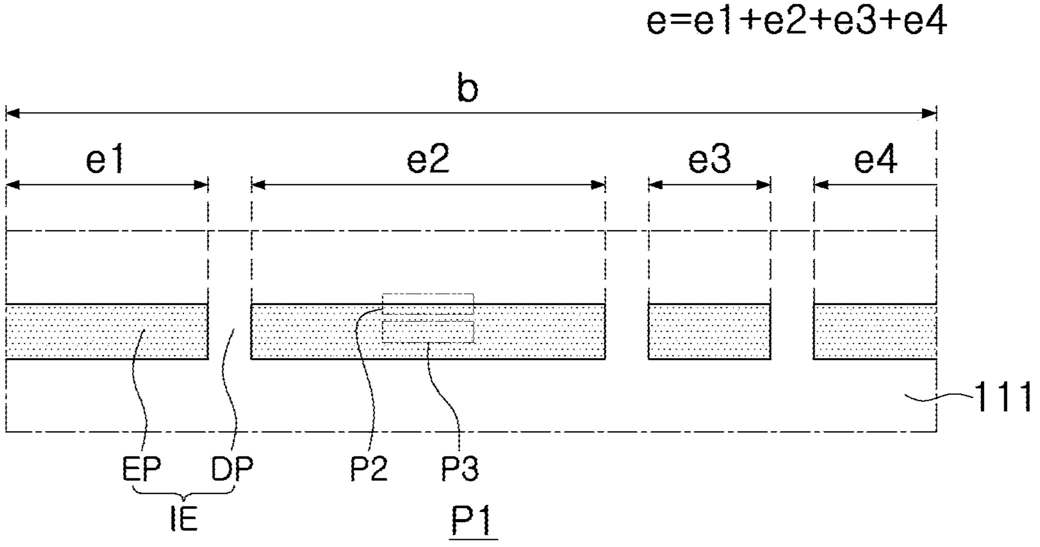
FIG. 6 is an enlarged view of area P1 in FIG. 3.

FIG. 6 is an enlarged view of area P1 in FIG. 3.

Figure 7:
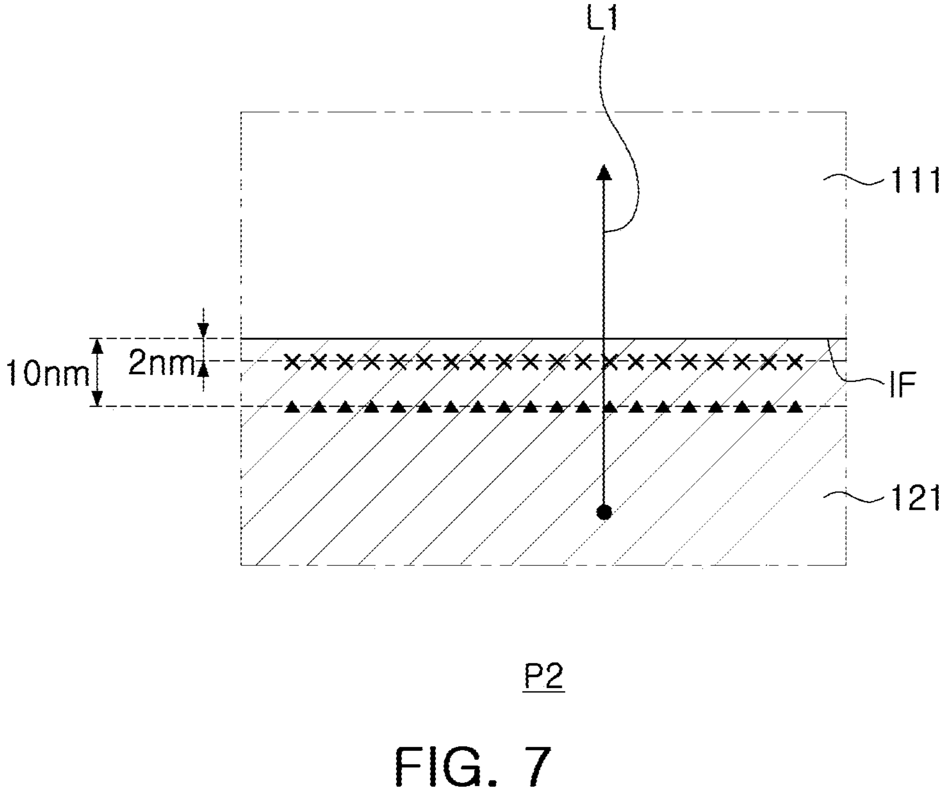
FIG. 7 is an enlarged view of area P2 in FIG. 6.

FIG. 7 is an enlarged view of area P2 in FIG. 6.

Figure 8:
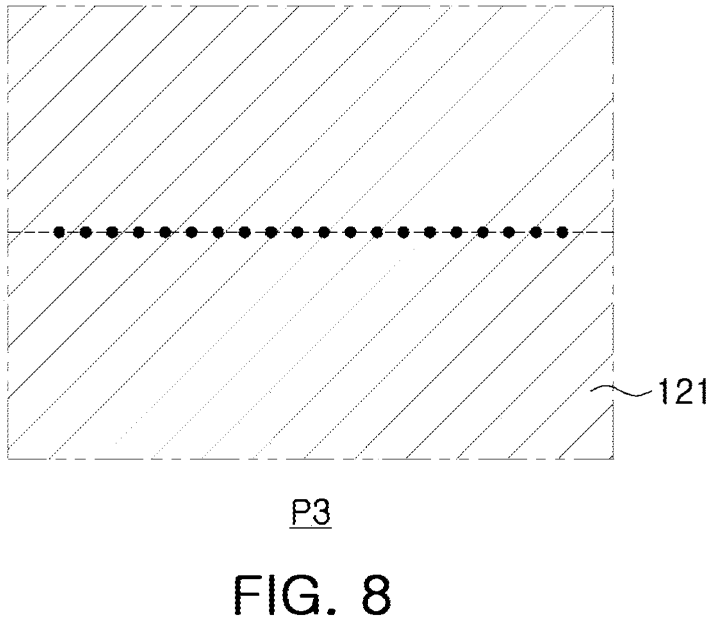
FIG. 8 is an enlarged view of area P3 in FIG. 6.

FIG. 8 is an enlarged view of area P3 in FIG. 6.

Hereinafter, a multilayer electronic component 100 according to an embodiment will be described in detail with reference to FIGS. 1 to 8. In addition, as an example of a multilayer electronic component, a multilayer ceramic capacitor (hereinafter referred to as 'MLCC'), will be described, but the present disclosure is not limited thereto, and may also be applied to various multilayer electronic components using ceramic materials, such as inductors, piezoelectric elements, varistors, thermistors, or the like.

The multilayer electronic component 100 according to an embodiment includes a body 110 including a dielectric layer 111 and internal electrodes 121 and 122 alternately disposed with the dielectric layer 111 therebetween; and external electrodes 131 and 132 disposed on the body. In one or more of the plurality of internal electrodes 121 and 122, among points 10 nm away from an interface (IF) with the dielectric layer, a ratio of points at which a molar ratio of In/(Ni+In) is 0.002 or more is 70% or more, and among central points in the first direction, a ratio of points at which a molar ratio of In/(Ni+In) is 0.002 or more may be 35% or less.

According to an embodiment, in one or more of the plurality of internal electrodes 121 and 122, among the points (▲) that are 10 nm away from the interface (IF) with the dielectric layer 111, the ratio of points at which the molar ratio of In/(Ni+In) is 0.002 or more satisfies 70% or more, and the ratio of points with a molar ratio of In/(Ni+In) of 0.002 or more among the central points (●) in the first direction satisfies 35% or less. Therefore, breakage and clumping of internal electrodes may be suppressed and the reliability of multilayer electronic components may be improved.

Hereinafter, each configuration of the multilayer electronic component 100 will be described in detail.

The body 110 may have dielectric layers 111 and internal electrodes 121 and 122 alternately stacked.

There is no particular limitation on the detailed shape of the body 110, but as illustrated, the body 110 may have a hexahedral shape or a similar shape. Due to shrinkage of the ceramic powder contained in the body 110 during the firing process, the body 110 may not have a hexahedral shape with completely straight lines, but may have a substantially hexahedral shape.

The body 110 may have first and second surfaces 1 and 2 opposing in a first direction, third and fourth surfaces 3 and 4 connected to the first and second surfaces 1 and 2 and opposing in a second direction, and fifth and sixth surfaces 5 and 6 connected to the first and second surfaces 1 and 2, connected to the third and fourth surfaces 3 and 4, and opposing in a third direction.

As the margin area in which the internal electrodes 121 and 122 are not placed overlaps on the dielectric layer 111, a step due to the thickness of the internal electrodes 121 and 122 occurs. Thus, a corner connecting the first surface and the third to fifth surfaces and/or a corner connecting the second surface and the third to fifth surfaces may have a shape contracted toward the center of the body 110 in the first direction when viewed from the first or second surface. Alternatively, due to the shrinkage behavior during the sintering process of the body, a corner connecting the first surface 1 and the third to sixth surfaces 3, 4, 5 and 6 and/or corners connecting the second surface 2 and the third to sixth surfaces 3, 4, 5 and 6 may have a shape contracted toward the center of the body 110 in the first direction when viewed from the first or second surface. Alternatively, to prevent chipping defects and the like, the edges connecting respective surfaces of the body 110 are rounded by performing a separate process. Thus, the corner connecting the first surface and the third to sixth surfaces and/or the corner connecting the second surface and the third to sixth surfaces may have a round shape.

On the other hand, to suppress the level difference caused by the internal electrodes 121 and 122, after lamination, the internal electrodes are cut to be exposed to the fifth and sixth surfaces 5 and 6 of the body, and then, when forming margin portions 114 and 115 by stacking a single dielectric layer or two or more dielectric layers on both sides of the capacitance forming portion Ac in the third direction (width direction), the portion connecting the first surface to the fifth and sixth surfaces and the portion connecting the second surface to the fifth and sixth surfaces may not have a contracted shape.

The plurality of dielectric layers 111 forming the body 110 are in a sintered state, and the boundaries between adjacent dielectric layers 111 may be integrated to the extent that it is difficult to check without using a scanning electron microscope (SEM). The number of stacked dielectric layers does not need to be particularly limited and may be determined considering the size of the multilayer electronic component. For example, the body may be formed by stacking 400 or more dielectric layers.

The dielectric layer 111 may be formed by producing a ceramic slurry containing ceramic powder, an organic solvent, and a binder, applying and drying the slurry on a carrier film to prepare a ceramic green sheet, and then by firing the ceramic green sheet. Ceramic powder is not particularly limited as long as sufficient capacitance may be obtained. For example, barium titanate ($BaTiO_3$)-based powder may be used as the ceramic powder. For more detailed examples, ceramic powder may be at least one of $BaTiO_3$, $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) and $Ba(Ti_{1-y}Zr_y)O_3$ (0<y<1).

In an embodiment, the dielectric layer 111 may include $Ba(Ti_{1-z}In_z)O_3$ (0<z<1). +3-valent In may be substituted at the Ti site of $BaTiO_3$, the main component of the dielectric layer. When substituted at the Ti site, In may act as an acceptor and improve the reliability of multilayer electronic components. However, the main component of the dielectric layer 111 is at least one of $BaTiO_3$, $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) and $Ba(Ti_{1-y}Zr_y)O_3$ (0<y<1), and In diffuses into the dielectric layer 111 and replaces at the Ti site of a portion of the main components. Thus, $Ba(Ti_{1-z}In_z)O_3$ (0<z<1) may not be included as the main component.

In an embodiment, the dielectric layer 111 may include Sn. Additionally, the average content of Sn relative to Ti in the area of the dielectric layer 111 spaced 2 nm from the interface IF with the internal electrodes 121 and 122 may be 0.02 at % or more and 0.42 at % or less. Sn has a low melting point, and thus may play a role in allowing In to easily diffuse to the interface (IF) and may play a role in allowing In to be easily trapped at the interface (IF), thereby easily improving capacitance and high-temperature load lifespan. However, if the average content of Sn compared to Ti in the area of the dielectric layer 111 2 nm away from the interface (IF) with the internal electrodes 121 and 122 is less than 0.02 at %, the above-described effect may be insufficient. If exceeding 0.42 at %, there is a risk that In diffusion may be excessive and the In content trapped at the interface may be reduced.

In an embodiment, the dielectric layer 111 may include Dy. Dy may play a role in improving high temperature load lifespan and dielectric constant. Additionally, the average content of Dy relative to Ti in a region of the dielectric layer 111 2 nm away from the interface IF with the internal electrodes 121 and 122 may be 3 at % or more and 7 at % or less. Accordingly, the high-temperature load lifespan may be more easily improved and the dielectric constant may be improved.

On the other hand, the dielectric layer 111 may further include various elements in addition to the elements described above. For example, the dielectric layer 111 may further include at least one of Ca, Mn, V, Cr, Fe, Ni, Co, Cu, Zn, Mg, Si, and rare earth elements (RE).

According to an embodiment of the present disclosure, reliability may be prevented from being reduced even when the thickness of the plurality of dielectric layers 111 is relatively thin. When the thickness of the dielectric layer is thick, reliability may be further improved. Therefore, there is no need to specifically limit an average thickness (td) of the dielectric layer 111, and the average thickness (td) of the dielectric layer 111 may be arbitrarily set depending on required characteristics or use. For a detailed example, the average thickness (td) of the dielectric layer 111 may be 300 nm or more and 10 μm or less. Additionally, the average thickness (td) of at least one of the plurality of dielectric layers 111 may be 300 nm or more and 10 μm or less.

In this case, the average thickness (td) of the dielectric layer 111 may refer to the average size of the dielectric layer 111 disposed between the internal electrodes 121 and 122 in the first direction. The average thickness of the dielectric layer 111 may be measured by scanning cross-sections of the body 110 in the first and second directions with a scanning electron microscope (SEM) at a magnification of 10,000. In more detail, the average value may be measured by measuring the thickness at multiple points of one dielectric layer 111, for example, 30 points at equal intervals in the second direction. The 30 equally spaced points may be designated in the capacitance forming portion Ac, which will be described later. Additionally, if this average value measurement is expanded to 10 dielectric layers 111 and the average value is measured, the average thickness of the dielectric layers 111 may be further generalized.

The body 110 may include a capacitance forming portion (Ac), which is disposed inside the body 110 and in which capacitance is formed by including a first internal electrode 121 and a second internal electrode 122 disposed to face each other with the dielectric layer 111 interposed therebetween, and cover portions 112 and 113 formed above and below the capacitance forming portion Ac in the first direction.

In addition, the capacitance forming portion (Ac) is a part that contributes to forming the capacitance of the capacitor, and may be formed by repeatedly stacking a plurality of first and second internal electrodes 121 and 122 with the dielectric layer 111 interposed therebetween.

The cover portions 112 and 113 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer or two or more dielectric layers on the upper and lower surfaces of the capacitance forming portion Ac in the thickness direction, respectively, and basically, may play a role in preventing damage to the internal electrodes due to physical or chemical stress.

The upper cover portion 112 and the lower cover portion 113 do not include internal electrodes and may include the same material as the dielectric layer 111.

For example, the upper cover portion 112 and the lower cover portion 113 may include a ceramic material, for example, a barium titanate ($BaTiO_3$)-based ceramic material.

On the other hand, the thickness of the cover portions 112 and 113 does not need to be particularly limited. For example, the thickness (tc) of the cover portions 112 and 113 may be 10 to 300 μm. However, to more easily obtain miniaturization and high capacitance of the multilayer electronic component, the thickness (tc) of the cover portions 112 and 113 may be 15 μm or less.

The average thickness (tc) of the cover portions 112 and 113 may refer to the size in the first direction, and may be an average value of sizes of the cover portions 112 and 113 in the first direction, measured at five points at equal intervals above or below the capacitance forming portion Ac.

Additionally, margin portions 114 and 115 may be disposed on the sides of the capacitance forming portion Ac.

The margin portions 114 and 115 may include a first margin portion 114 disposed on the fifth surface 5 of the body 110 and a second margin portion 115 disposed on the sixth surface 6. For example, the margin portions 114 and 115 may be disposed on both end surfaces of the ceramic body 110 in the width direction.

As illustrated in FIG. 3, the margin portions 114 and 115 may refer to the area between both ends of the first and second internal electrodes 121 and 122 and the boundary surface of the body 110 in a cross-section of the body 110 in the width-thickness (W-T) direction.

The margin portions 114 and 115 may basically serve to prevent damage to the internal electrodes due to physical or chemical stress.

The margin portions 114 and 115 may be formed by forming internal electrodes by applying conductive paste on a ceramic green sheet except for areas where the margin portion is to be formed.

In addition, to suppress the level difference caused by the internal electrodes 121 and 122, after lamination, the internal electrodes are cut to be exposed to the fifth and sixth surfaces 5 and 6 of the body, and then a single dielectric layer or two or more dielectric layers may be stacked on both sides of the capacitance forming portion Ac in the third direction (width direction) to form the margin portions 114 and 115.

On the other hand, the width of the margin portions 114 and 115 does not need to be particularly limited. For example, the width of the margin portions 114 and 115 may be 5 to 300 μm. However, to more easily obtain miniaturization and high capacitance of multilayer electronic components, the average width of the margin portions 114 and 115 may be 15 μm or less.

The average width of the margin portions 114 and 115 may refer to the average size of the area in which the internal electrode is spaced apart from the fifth surface 5 in the third direction and the average size of the area in which the internal electrode is spaced apart from the sixth surface 6 in the third direction, and may be an average value of sizes of the margin portions 114 and 115 in the third direction, measured at five points at equal intervals on the side of the capacitance forming portion Ac.

Accordingly, in an embodiment, the average size of the areas where the internal electrodes 121 and 122 are spaced apart from the fifth and sixth surfaces 5 and 6 in the third direction may each be 15 μm or less.

The internal electrodes 121 and 122 may include first and second internal electrodes 121 and 122. The first and second internal electrodes 121 and 122 are alternately disposed to face each other with the dielectric layer 111 constituting the body 110 interposed therebetween, and may be exposed to the third and fourth surfaces 3 and 4 of the body 110, respectively.

The first internal electrode 121 may be spaced apart from the fourth surface 4 and exposed through the third surface 3, and the second internal electrode 122 may be spaced apart from the third surface 3 and exposed through the fourth surface 4. A first external electrode 131 is disposed on the third surface 3 of the body and connected to the first internal electrode 121, and a second external electrode 132 may be disposed on the fourth surface 4 of the body and connected to the second internal electrode 122.

For example, the first internal electrode 121 is not connected to the second external electrode 132, but is connected to the first external electrode 131, and the second internal electrode 122 is not connected to the first external electrode 131 but is connected to the second external electrode 132. Accordingly, the first internal electrode 121 is formed at a certain distance from the fourth surface 4, and the second internal electrode 122 may be formed at a certain distance from the third surface 3. Additionally, the first and second internal electrodes 121 and 122 may be disposed to be spaced apart from the fifth and sixth surfaces 5 and 6 of the body 110.

According to an embodiment, in one or more of the plurality of internal electrodes 121 and 122, among the points (▲) 10 nm apart from the interface (IF) with the dielectric layer, the ratio (A) of points at which the molar ratio of In/(Ni+In) is 0.002 or more may satisfy 70% or more, and the ratio (B) of points at which the molar ratio of In/(Ni+In) is 0.002 or more among the central points (●) in the first direction may satisfy 35% or less. In this manner, as a region with a relatively high In content in the internal electrodes 121 and 122 is placed in a region adjacent to the interface (IF) with the dielectric layer, the interfacial bonding force between the dielectric layer and the internal electrode may be improved, and the region with high In content may act as a kind of semiconductor barrier that prevents electron movement from the internal electrode to the dielectric layer or from the dielectric layer to the internal electrode. Therefore, both capacitance and high-temperature load lifespan may be improved.

In this case, the molar ratio of In/(Ni+In) may be calculated as [mol amount of In/(mol amount of Ni+mol amount of In)]. Hereinafter, among the points (▲) within the internal electrode, which are 10 nm apart from the interface (IF) with the dielectric layer, the ratio of points at which the molar ratio of In/(Ni+In) is 0.002 or more is referred to as 'A', and among the central points (●) of the internal electrode in the first direction, the ratio of points at which the molar ratio of In/(Ni+In) is 0.002 or more is referred to as 'B'. Additionally, 'A' and 'B' may each be measured at at least 20 points.

If 'A' is greater than 0% but less than 70%, the capacitance may be improved compared to the case in which 'A' is 0%, but there is a risk that the high temperature load lifespan may be reduced. Therefore, 'A' may be, in detail, 70% or more, and to further improve capacitance and high temperature load lifespan, 'A' may be more preferably 75% or more. On the other hand, the upper limit of 'A' does not need to be particularly limited, and as a detailed example, 'A' may be 90% or less.

On the other hand, if 'B' exceeds 35%, there is a risk that the capacitance may decrease or the high-temperature load lifespan may decrease, and thus 'B' may be 35% or less. In addition, there is no need to specifically limit the lower limit of 'B', but if 'B' is more than 0% and less than 20%, the capacitance may be improved compared to the case in which 'B' is 0%, but there is a risk that high temperature load lifespan may be reduced. Therefore, as a detailed example, 'B' may be 20% or more.

Referring to FIGS. 6 to 8 as an example of a method of measuring 'A' and 'B', after polishing the multilayer electronic component to the center in the second direction to expose the cross section in the first and third directions, in one internal electrode (121, 122), 20 points (▲) spaced 10 nm apart from the interface (IF) with the dielectric layer 111 and 20 points (●) in the center in the first direction are selected, and at each of the selected points, the molar ratio of In/(Ni+In) may be measured through quantitative analysis of In and Ni by STEM-EDS, thereby obtaining 'A' and 'B'. At this time, the 20 points (▲) spaced 10 nm apart from the interface (IF) with the dielectric layer 111 may be designated to have equal intervals. Additionally, the 20 points (●) in the center in the first direction may also be designated to have equal intervals. However, the present disclosure is not limited thereto, and the central portion of the internal electrode in the first direction may refer to the area located at the center when the internal electrode is divided into three parts in the first direction. Also, the 20 points (●) in the center of the internal electrode in the first direction may be 20 random points selected from the center of the internal electrode of the first direction. On the other hand, as illustrated in FIG. 4, an internal electrode is selected one by one in each of the central area located at the center of the body 100 in the width and thickness direction, the upper area adjacent to the upper cover portion 112, and the lower area adjacent to the lower cover portion 113, and after obtaining 'A' and 'B' from each internal electrode, an average value thereof may be calculated, and thus, the values of 'A' and 'B' may be more generalized.

In addition, in the case of the interface (IF) between the dielectric layer 111 and the internal electrodes 121 and 122, lines shown on both sides of the interface by scanning transmission electron microscopy (STEM), for example, the Fresnel fringes may be observed, and the point where the contrast of the Fresnel fringes changes almost symmetrically on both sides when the focus is changed may be the interface.

On the other hand, the method of controlling 'A' and 'B' does not need to be particularly limited. As a detailed example, 'A' and 'B' may be controlled by controlling the amount of In compared to Ni added to the conductive paste and controlling the oxygen partial pressure conditions during firing. Indium (In) is an element with a stronger tendency to oxidize than nickel (Ni). When In is added as an internal electrode material and then fired, a portion of In is oxidized and diffuses to the dielectric layer to replace Ti sites such as $BaTiO_3$ or the like, and the others are not oxidized and may form an alloy with Ni remaining in the internal electrode. Additionally, a portion of the In that diffuses from the internal electrode toward the dielectric layer may be trapped at the interface between the dielectric layer and the internal electrode, forming a region with a high In content at the interface and the area adjacent to the interface.

In an embodiment, in one or more of the plurality of internal electrodes 121 and 122, when the average value of the molar ratio of In/(Ni+In) at points 2 nm apart from the interface (IF) with the dielectric layer is X and the average value of the molar ratio of In/(Ni+In) at points 10 nm away from the interface (IF) with the dielectric layer is Y, X−Y may be 0.0041 or more.

If X−Y is greater than 0 and less than 0.0041, the capacitance decreases compared to when X−Y is 0, or there is a risk that high-temperature load lifespan may be reduced. Thus it may be difficult to improve both capacitance and high-temperature load lifespan. Therefore, in detail, X−Y may be 0.0041 or more, and to further improve capacitance and high temperature load lifespan, it may be more preferable for X−Y to be 0.0057 or more. On the other hand, there is no need to specifically limit the upper limit of X−Y, and as a preferred example, X−Y may be 0.0098 or less.

Referring to FIG. 7 as an example of a method of measuring X and Y, after polishing the multilayer electronic component to the center in the second direction to expose the cross section in the first and third directions, in the internal electrodes 121 and 122, 20 points (x) spaced 2 nm apart and 20 points (▲) spaced 10 nm apart from the interface (IF) with the dielectric layer 111 are selected, and after calculating the molar ratios of In/(Ni+In) through quantitative analysis of In and Ni by STEM-EDS at the respective selected points, the average value of the molar ratio of In/(Ni+In) measured at 20 points (x) 2 nm apart may be X, and the average value of the molar ratio of In/(Ni+In) measured at 20 points (▲) spaced 10 nm apart may be Y.

In addition, the interface (IF) between the dielectric layer 111 and the internal electrodes 121 and 122 is observed by observing lines, for example, Fresnel fringes, which appear on both sides of the interface using a scanning transmission electron microscope (STEM). In this case, the point at which the contrast of the Fresnel fringe changes almost symmetrically on both sides when the focus is changed is designated as the interface.

In an embodiment, X may be less than or equal to 0.0139. If X is greater than 0.0139, the capacitance decreases or there is a risk that high-temperature load lifespan may be reduced, and thus it may be difficult to improve both capacitance and high-temperature load lifespan.

In an embodiment, to improve both capacitance and high temperature load lifespan, in detail, X may be 0.0046 or more and 0.0139 or less, and Y may be 0.0005 or more and 0.0041 or less. In addition, to further improve capacitance and high temperature load lifespan, in more detail, X may be 0.0067 or more and 0.0139 or less, and Y may be 0.0010 or more and 0.0041 or less.

In an embodiment, when the average grain size of the dielectric grains included in the cover portions 112 and 113 is Gc, the average grain size of the dielectric grains included in the capacitance forming portion (Ac) is Ga, and the average grain size of the dielectric grains included in the margin portions 114 and 115 is Gm; $1<Gc/Ga$ and $1<Gm/Ga$ may be satisfied. The average grain size (Ga) of the dielectric grains included in the capacitance forming portion (Ac) may be controlled to be less than the average grain sizes (Gc, Gm) of the dielectric grains included in the cover portions 112 and 113 and the margin portions 114 and 115, thereby improving insulation resistance of the multilayer electronic component 100.

The grain size of the dielectric grain may be determined by drawing a straight line from one point on the grain boundary of the dielectric grain to another point thereon, by referring the line with the greatest value as to the major axis and the line with the greatest value among the straight lines perpendicular to the major axis as to the minor axis, and by taking the average value of the major axis and the minor axis as the grain size of the dielectric crystal grain. Additionally, the average grain size of at least 100 dielectric crystal grains may be taken as the average grain size of the dielectric grains.

As an example of a method of measuring Ga, Gc, and Gm, the multilayer electronic component is polished to the center in the second direction to expose the first and third direction cross sections, and then, Ga, Gc, and Gm may be measured from an image obtained by scanning with a scanning electron microscope (SEM). At this time, the magnification may vary depending on the grain size of the dielectric grains, and the magnification may be adjusted such that the grain size of at least 100 dielectric grains may be measured. In more detail, referring to FIG. 4, Ga may be measured from an image scanned to include at least 100 dielectric crystal grains in a central area located in the center of the body 100 in the width and thickness directions, Gc may be measured from an image scanned to include at least 100 dielectric crystal grains in the central area of the cover portion located in the center of the cover portions 112 and 113 in the width and thickness directions, and Gm may be measured from an image scanned to include at least 100 dielectric grains in the central area of the margin portion located in the center of the margin portions 114 and 115 in the width and thickness directions.

In an embodiment, the Ga and Gc may satisfy $1<Gc/Ga\leq1.28$. If Gc/Ga is greater than 1.28, the average grain size (Ga) of the dielectric crystal grains included in the capacitance forming portion (Ac) is too small, and there is a risk that the capacitance may decrease and there is a risk that the variation in capacitance and/or Dissipation Factor (DF) may increase.

In an embodiment, the Ga and Gm may satisfy $1<Gm/Ga\leq1.07$. If Gm/Ga is more than 1.07, the average grain size (Ga) of the dielectric crystal grains contained in the capacitance forming portion (Ac) is too small, and there is a risk that the capacitance may decrease and there is a risk that the variation in capacitance and/or Dissipation Factor (DF) may increase.

In an embodiment, the internal electrodes 121 and 122 include Ni and In, and at least a portion of In contained in the internal electrodes 121 and 122 may be present in an alloy form with Ni. Accordingly, the connectivity of the internal electrode is improved by reducing the grain boundary energy and surface tension of Ni, and the thickness deviation of the internal electrode may be reduced. Whether Ni and In are present in an alloy form may be confirmed by whether the peak position of Ni is shifted when analyzed by X-ray diffraction (XRD). For a detailed example, after pulverizing the internal electrode of a multilayer electronic component to obtain a powder form, the powder may be analyzed by XRD to determine whether the peak position of Ni has shifted.

In an embodiment, the internal electrodes 121 and 122 may include Sn. Sn has a low melting point, and may thus play a role in allowing In to easily diffuse to the interface (IF). Sn may also serve to allow In to be easily trapped at the interface (IF), and thus serve to improve capacitance and high-temperature load lifespan more easily.

On the other hand, the internal electrodes 121 and 122 may contain metals other than Ni, In, Ni—In, and Sn. For example, the internal electrodes 121 and 122 may further include at least one of Cu, Pd, Ag, Au, Pt, Al, Ti, and alloys thereof.

In an embodiment, in the internal electrode and the dielectric layer, a region within 2 nm from the interface (IF) may have a higher average In content than other regions. Accordingly, the interfacial bonding strength between the dielectric layer and the internal electrode may be further improved, and by further improving the effect of acting as a kind of semiconductor barrier that prevents electron movement from the internal electrode to the dielectric layer or from the dielectric layer to the internal electrode, capacitance and high-temperature load lifespan may be further improved.

Figure 9A:
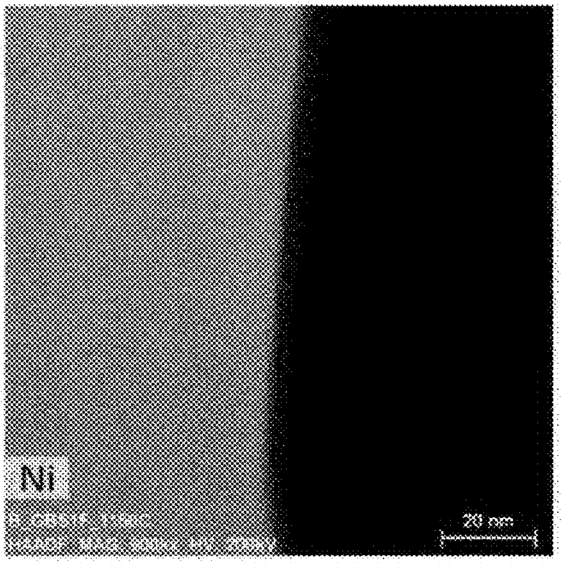
FIG. 9A is an image of an interface between an internal electrode and a dielectric layer analyzed by STEM-EDS according to an embodiment to show a mapping image of Ni element by STEM-EDS.
Figure 9B:
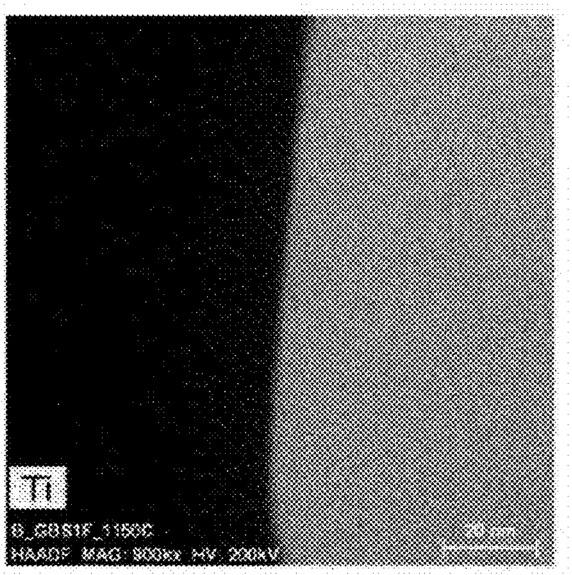
FIG. 9B is an image of an interface between an internal electrode and a dielectric layer analyzed by STEM-EDS according to an embodiment to show a mapping image of Ti element by STEM-EDS.
Figure 9C:
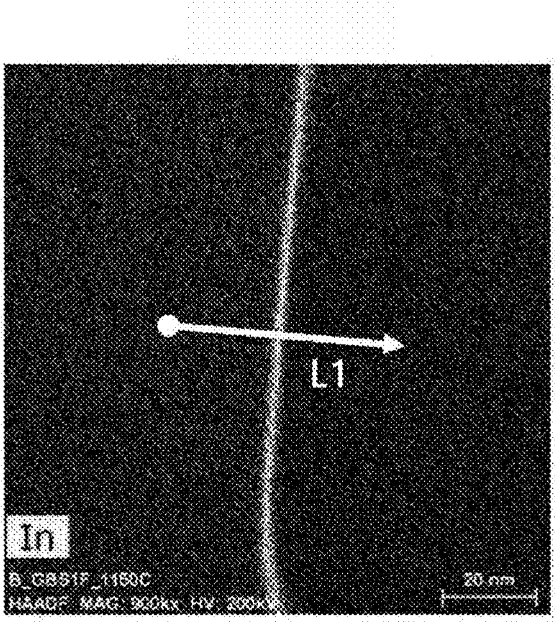
FIG. 9C is an image of an interface between an internal electrode and a dielectric layer analyzed by STEM-EDS according to an embodiment to show an image of mapping of In element using STEM-EDS.

FIG. 9A is an image of the interface between the internal electrode and the dielectric layer, analyzed by STEM-EDS, according to an embodiment, to show an image mapping the Ni element using STEM-EDS, FIG. 9B is an image of the interface between the internal electrode and the dielectric layer, analyzed by STEM-EDS, according to an embodiment, to show an image mapping the Ti element using STEM-EDS, and FIG. 9C is an image of the interface between the internal electrode and the dielectric layer, analyzed by STEM-EDS, according to an embodiment, to show an image mapping the In element using STEM-EDS.

Referring to FIGS. 9A and 9B, it can be seen that the dielectric layer and the internal electrode may be clearly distinguished based on the Ni content and Ti content. Referring to FIG. 9C, it can be seen that the In content is high at the interface between the dielectric layer and the internal electrode.

Figure 10A:
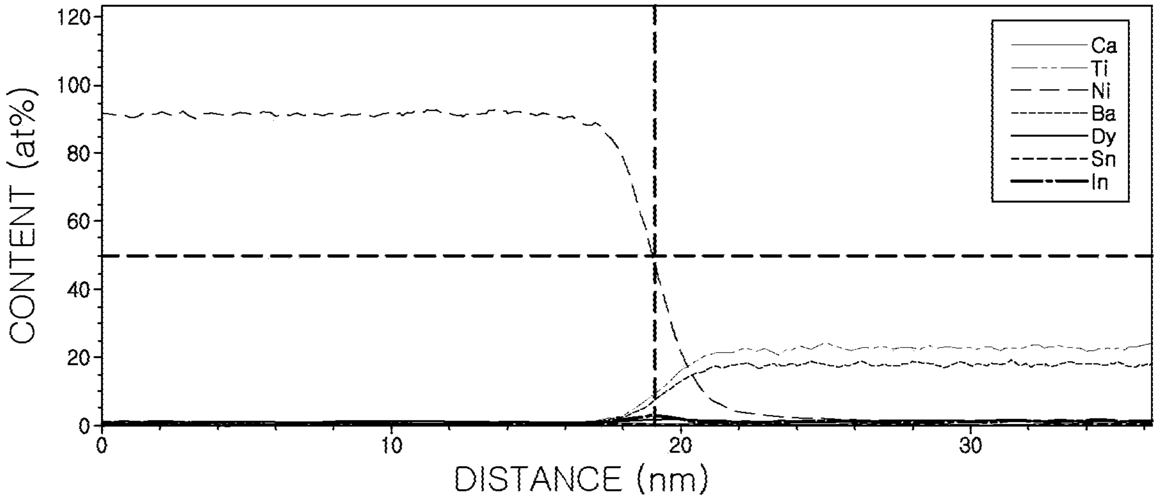
FIG. 10A illustrates the result of a line profile using STEM-EDS along L1 illustrated in FIG. 9C.
Figure 10B:
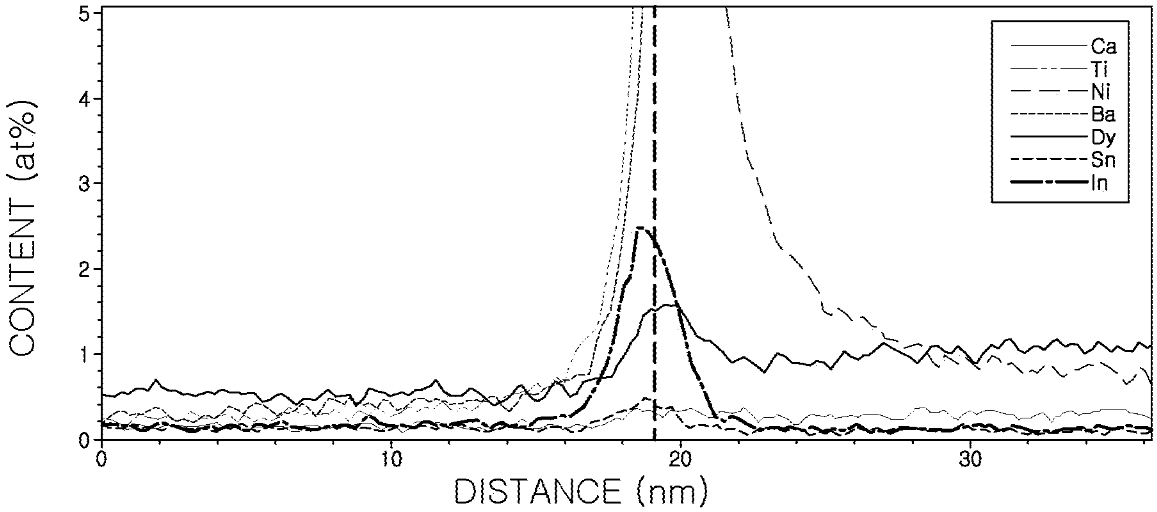
FIG. 10B is an enlarged graph of a portion of FIG. 10A.

If a line profile is performed using STEM-EDS along L1, which is a line perpendicular to the interface between the dielectric layer and the internal electrode in FIGS. 7 and 9C, changes in element content depending on location may be analyzed more quantitatively. Referring to FIG. 10A and FIG. 10B, which is the result of a line profile using STEM-EDS along L1 illustrated in FIG. 9C, it can be seen that peak values of In, Dy, and Sn contents are detected within the area adjacent to the interface between the dielectric layer and the internal electrode.

In addition, the peak value of In content is detected in the area in which the Ni content is more than 50 at % and 90 at % or less, which may be due to the diffusion of In contained in the conductive paste for internal electrodes into the dielectric layer. Therefore, in an embodiment, when analyzing the line profile of the area adjacent to the interface IF in a direction perpendicular to the interface between the dielectric layer and the internal electrode, the peak value of In content may be detected in the area in which the Ni content is more than 50 at % and 90 at % or less. In addition, the peak value of Sn content may also be detected in a region of more than 50 at % and 90 at % or less. At this time, line profile analysis may be performed using STEM-EDS.

On the other hand, the peak value of Dy content is detected in the area in which the Ni content is 10 at % or more and less than 50 at %, which may be due to the diffusion of Dy added to the ceramic green sheet to the internal electrode. Therefore, in an embodiment, when analyzing the line profile of the area adjacent to the interface IF in a direction perpendicular to the interface between the dielectric layer and the internal electrode, the peak value of Dy content may be detected in an area in which the Ni content is 10 at % or more and less than 50 at %. At this time, line profile analysis may be performed using STEM-EDS.

In an embodiment, the internal electrodes 121 and 122 include ceramic particles, and the ceramic particles may include In.

Ceramic particles included in the internal electrodes 121 and 122 may play a role in reducing the difference in sintering start temperature between the dielectric layer and the internal electrode. Ceramic particles added to the conductive paste for internal electrodes may be trapped within the internal electrode after firing. Additionally, as In is added to the conductive paste for internal electrodes, the ceramic particles included in the internal electrodes 121 and 122 may contain In.

At this time, In may be mainly distributed on the surface of the ceramic particle, which is the interface between the ceramic particle and the internal electrode, similar to the interface (IF) between the internal electrode and the dielectric layer. Therefore, in the case of ceramic particles, the In content on the surface of ceramic particles is higher than the In content in the inside thereof, and the average content of In compared to Ti on the surface of the ceramic particle may be 0.3 at % or more. Additionally, the average content of In compared to Ti on the surface of the ceramic particle may be 0.3 at % or more and 3.8 at % or less.

Figure 14A:
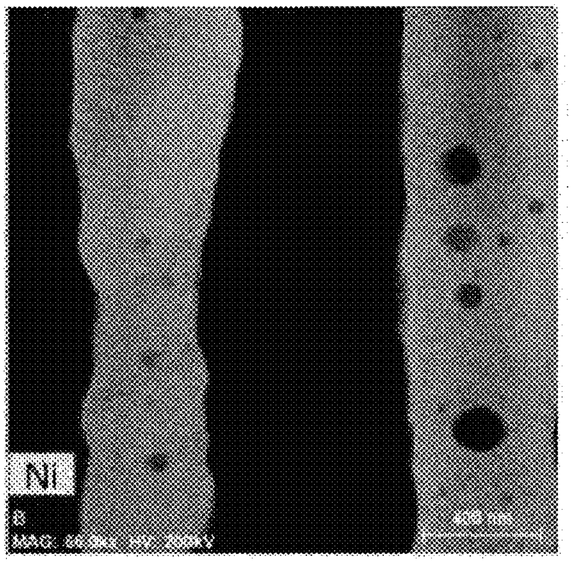
FIG. 14A is an image of the interface between the internal electrode and the dielectric layer analyzed by STEM-EDS according to an embodiment to shown an image mapping the Ni element using STEM-EDS.
Figure 14B:
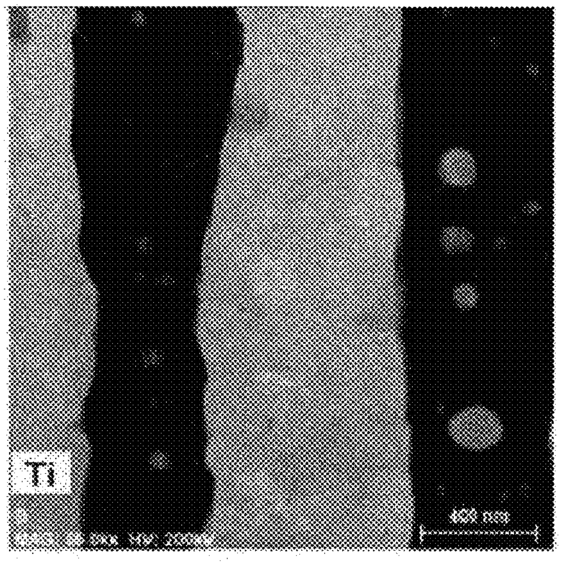
FIG. 14B is an image of the interface between the internal electrode and the dielectric layer analyzed by STEM-EDS according to an embodiment to shown an image mapping the Ti element using STEM-EDS.
Figure 14C:
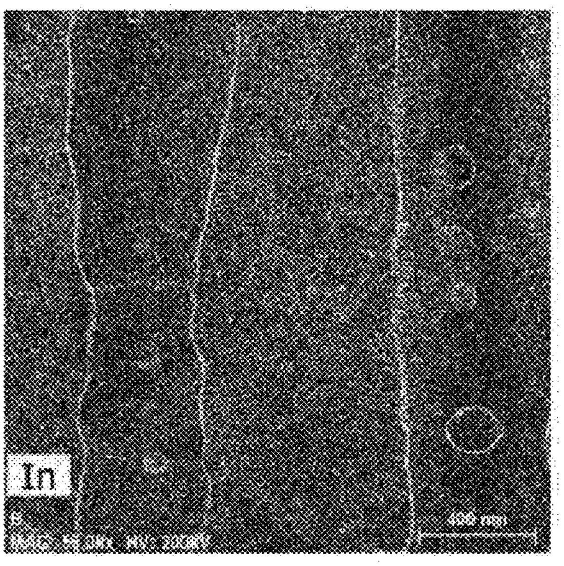
FIG. 14C is an image of the interface between the internal electrode and the dielectric layer analyzed by STEM-EDS according to an embodiment to shown an image mapping the In element using STEM-EDS.

FIG. 14A is an image of the interface between the internal electrode and the dielectric layer according to an embodiment, analyzed by STEM-EDS, to show an image mapping the Ni element using STEM-EDS, FIG. 14B is an image of the interface between the internal electrode and the dielectric layer according to an embodiment, analyzed by STEM-EDS, to show an image mapping the Ti element using STEM-EDS, and FIG. 14C is an image of the interface between the internal electrode and the dielectric layer according to an embodiment, analyzed by STEM-EDS, to show an image mapping the In element using STEM-EDS. Referring to FIGS. 14A and 14B, it can be seen that ceramic particles are trapped inside the internal electrode. Additionally, referring to FIG. 14C, it can be seen that the In content is high on the surface of the ceramic particles and it can be seen that the In content on the surface of the ceramic particle is similar to the In content at the interface (IF) between the internal electrode and the dielectric layer.

As an example of a method of measuring the average content of In compared to Ti on the surface of a ceramic particle, the multilayer electronic component is polished to the center in the second direction to expose the cross section in the first and third directions, and then, five points at the boundary formed by one of the ceramic particles trapped in the internal electrodes 121 and 122 with the internal electrode are selected, and then, quantitative analysis of Ti and In by STEM-EDS is performed at the above five points to obtain the content of In compared to Ti, thereby calculating the average of values thereof and thus measuring the average content of In. In addition, four different ceramic particles may be selected among the trapped ceramic particles to measure five areas at each boundary between each ceramic particle and the internal electrode, thereby further generalizing by calculating the average value of a total of 20 measurements.

On the other hand, the average thickness (te) of the internal electrodes 121 and 122 does not need to be particularly limited, and may be set arbitrarily depending on the required characteristics or use. For a detailed example, the average thickness (te) of the internal electrodes 121 and 122 may be 300 nm or more and 3 μm or less. Additionally, the average thickness (te) of at least one of the plurality of internal electrodes 121 and 122 may be 300 nm or more and 3 μm or less.

The thickness of the internal electrodes 121 and 122 may refer to the size of the internal electrodes 121 and 122 in the first direction. The average thickness (te) of the internal electrode may be measured by scanning a cross-section of the body 110 in the first and second directions with a scanning electron microscope (SEM) at 10,000 magnification. In more detail, the average value may be measured by measuring the thickness at multiple points of one internal electrode (121, 122), for example, at 30 points at equal intervals in the second direction. The 30 equally spaced points may be designated in the capacitance forming portion (Ac). Additionally, if this average value measurement is expanded to 10 internal electrodes 121 and 122 and the average value is measured, the average thickness of the internal electrodes 121 and 122 may be further generalized.

In an embodiment, when the average thickness of the internal electrodes 121 and 122 is te and the standard deviation of the thickness of the internal electrodes 121 and 122 is σte, σte/te may be 0.2 or less. For example, the coefficient of variation (CV) of the thickness of the internal electrode may be 0.2 or less, which may indicate that the thickness uniformity of the internal electrode is within 20%. Additionally, σte/te may be, in more detail, 0.18 or less, and more preferably 0.17 or less. Additionally, more preferably, the standard deviation (σte) of the thickness of the internal electrodes 121 and 122 may be within #70 nm.

When σte/te is 0.2 or less, stress may be prevented from being unevenly applied to the internal electrodes 121 and 122 and electric field concentration may be prevented by ensuring uniformity of the thickness of the internal electrodes 121 and 122, thereby improving reliability.

The standard deviation (σte) of the thickness of the internal electrode may be measured by subtracting the average thickness (te) of the internal electrodes from each thickness measured at 30 equally spaced points in the second direction to then be squared, to measure the average thickness (te) of the internal electrodes 121 and 122, and by calculating the average of these values to obtain the variance, and then by taking the square root of the variance.

In an embodiment, the connectivity of the internal electrodes 121 and 122 may be 85% or more. Additionally, in more detail, the connectivity of the internal electrodes 121 and 122 may be 90% or more.

Referring to FIG. 6, the internal electrode (IE) includes a plurality of conductive portions (EP), and may include a disconnection portion (DP) between adjacent conductive portions (EP). When the total length of the internal electrode (IE) is b and the lengths of the plurality of conductive portions (EP) are e1, e2, e3, and e4, respectively, the ratio of the sum (e=e1+e2+e3+e4) of the lengths of the plurality of conductive portions (EP) to the total length (b) of the internal electrode (IE) may be defined as the connectivity of the internal electrode.

The connectivity of the internal electrodes may be measured from an image scanned of a cross-section of the body 110 in the first and second directions using a scanning electron microscope (SEM) at 10,000 magnification. In more detail, after measuring the connectivity of each of the ten internal electrodes 121 and 122 in the image, the average value thereof may be taken as the connectivity of the internal electrodes.

The external electrodes 131 and 132 may be disposed on the third surface 3 and the fourth surface 4 of the body 110.

The external electrodes 131 and 132 may include first and second external electrodes 131 and 132 respectively disposed on the third and fourth surfaces 3 and 4 of the body 110 and connected to the first and second internal electrodes 121 and 122, respectively.

In this embodiment, although a structure in which the multilayer electronic component 100 has two external electrodes 131 and 132 is described, the number or shape of the external electrodes 131 and 132 may be changed depending on the shape of the internal electrodes 121 and 122 or other uses.

On the other hand, the external electrodes 131 and 132 may be formed using any material as long as it has electrical conductivity, such as metal, and a detailed material of the external electrodes 131 and 132 may be determined considering electrical properties, structural stability, and the like, and may have a multilayer structure.

For example, the external electrodes 131 and 132 may include electrode layers 131*a* and 132*a* disposed on the body 110 and plating layers 131*b* and 132*b* formed on the electrode layers 131*a* and 132*a*.

For more detailed examples of the electrode layers 131*a* and 132*a*, the electrode layers 131*a* and 132*a* are firing electrodes containing conductive metal and glass, or may be a resin-based electrode containing a conductive metal and resin.

Additionally, the electrode layers 131*a* and 132*a* may be formed by sequentially forming a firing electrode and a resin-based electrode on a body. Additionally, the electrode layers 131*a* and 132*a* may be formed by transferring a sheet containing conductive metal onto the body, or may be formed by transferring a sheet containing conductive metal onto a firing electrode. Additionally, the electrode layers 131*a* and 132*a* may be formed as a plating layer or may be a layer formed using a deposition method such as sputtering or Atomic layer deposition (ALD).

As the conductive metal included in the electrode layers 131*a* and 132*a*, a material with excellent electrical conductivity may be used and is not particularly limited. For example, the conductive metal may be at least one of nickel (Ni), copper (Cu), and an alloy thereof.

The plating layers 131*b* and 132*b* serve to improve mounting characteristics. The types of plating layers 131*b* and 132*b* are not particularly limited, and may be a plating layer containing at least one of Ni, Sn, Pd, and alloys thereof, and may be formed of multiple layers.

For more detailed examples of the plating layers 131*b* and 132*b*, the plating layers 131*b* and 132*b* may be Ni plating layers or Sn plating layers, and may be in the form in which a Ni plating layer and a Sn plating layer are formed sequentially on the electrode layers 131*a* and 132*a*, and may be in the form in which the Sn plating layer, Ni plating layer, and Sn plating layer are formed sequentially. Additionally, the plating layers 131*b* and 132*b* may include a plurality of Ni plating layers and/or a plurality of Sn plating layers. Additionally, the plating layers 131*b* and 132*b* may be formed by sequentially forming a Ni plating layer and a Pd plating layer on the electrode layers 131*a* and 132*a*.

The size of the multilayer electronic component 100 does not need to be particularly limited. The multilayer electronic component 100 according to an embodiment of the present disclosure may be advantageous for miniaturization and high capacitance, and may thus be applied to small IT products. Because high reliability may be secured in a variety of environments, the multilayer electronic component 100 according to an embodiment may also be applied to the size of automotive electronic products that require high reliability.

Hereinafter, the present disclosure will be described in more detail through experimental examples, but this is intended to aid detailed understanding of the present disclosure and the scope of the present disclosure is not limited by the experimental examples.

Experimental Example 1

Ceramic green sheets coated with internal electrode paste were stacked and cut and fired to form a body. Then, a sample chip was produced by applying paste for external electrodes on the body and firing the same.

At this time, sample chips were manufactured by varying the In content compared to the Ni powder contained in the internal electrode paste for respective test numbers. In test number 1, In was not added to the paste for internal electrodes.

In addition, the ceramic c green sheet was manufactured by adding an organic solvent, a binder, and dispersant to barium titanate ($BaTiO_3$) powder. In was not added to the ceramic green sheet.

After polishing the sample chip to the center in the second direction to expose the cross section in the first and third directions, as illustrated in FIG. 4, for each of the central area located at the center in the width and thickness directions, the upper area adjacent to the upper cover portion, and the lower area adjacent to the lower cover portion, thin-sectioned samples were prepared using a microsampling processing method using FIB.

The thinned sample was processed to have a thickness of 60 nm or less. On the other hand, the damage layer on the sample surface formed during FIB processing was removed by Ar ion milling.

An internal electrode was selected one by one from each of the thinned samples produced as described above, and was analyzed using a scanning transmission electron microscope (STEM) and an energy dispersive X-ray analysis device (EDS). In addition, in the STEM analysis, an ARM-200F (JEOL product) was used as a scanning transmission electron microscope. The acceleration voltage was 200 kV. Additionally, oxford EDS was used as the EDS equipment.

Among the points spaced 10 nm away from the interface (IF) with the dielectric layer within the internal electrode, ‘A’, which is the ratio of points at which the molar ratio of In/(Ni+In) is 0.002 or more, and ‘B’, which is the ratio of points at which the molar ratio of In/(Ni+In) is 0.002 or more among the central points of the internal electrode in the first direction, were measured and are listed in Table 1 below. Referring to FIG. 7, 20 points (▲) spaced 10 nm apart from the interface (IF) with the dielectric layer 111 in the internal electrodes 121 and 122 per specimen were observed, and a total of 60 points were analyzed to obtain ‘A’. Referring to FIG. 8, 20 points (●) in the center in the internal electrodes 121 and 122 in the first direction per specimen were observed, and a total of 60 points were analyzed to obtain ‘B’.

In addition, X, which is the average value of the molar ratio of In/(Ni+In) at points (x) 2 nm apart from the interface (IF) with the dielectric layer, and Y, which is the average value of the molar ratio of In/(Ni+In) at points nm apart from the interface (IF) with the dielectric layer, were measured and are listed in Table 2 below. Referring to FIG. 7, 20 points (x) spaced 2 nm apart from the interface (IF) with the dielectric layer 111 in the internal electrodes 121 and 122 per specimen were observed, and a total of 60 points were analyzed to obtain X, and 20 points (A) spaced 10 nm apart from the interface (IF) with the dielectric layer 111 in the internal electrodes 121 and 122 per specimen were observed, and a total of 60 points were analyzed to obtain Y.

Additionally, the measurement probe diameter of the electron beam was set to about 1 nm, and the measurement time was set to 30 seconds. On the other hand, quantitative correction from the obtained EDS spectrum used Cliff-Lorimer correction.

In the case of the interface (IF) between the dielectric layer 111 and the internal electrodes 121 and 122, by observing the lines that appear on both sides of the interface, for example, Fresnel fringes, using a scanning transmission electron microscope (STEM), the point at which the contrast of the Fresnel fringes changes almost symmetrically on both sides when the focus changes was used as the interface.

Capacitance was measured on 10 sample chips for each test number, and by using an automatic bridge measuring device, the capacitance was measured under the conditions of AC voltage of 1 Vrms and 1 kHz, and the average value for each test number was obtained. The capacitance of test number 1 was set as the standard value ‘1’, and test numbers 2 to 9 were recorded as relative values to the capacitance of test number 1.

Mean Time to Failure (MTTF) was measured for 10 sample chips per test number, and a high-temperature load test was conducted under the conditions of 165° C. and 7.5V. The time when the insulation resistance was 10KΩ or less was determined as the failure time, and the average value thereof was calculated. The MTTF of test number 1 was set as the standard value ‘1’, and for test numbers 2 to 9, relative values to the MTTF of test number 1 are listed.

In the case of the connectivity of the internal electrode, by polishing the sample chip to the center in the second direction to expose the cross section in the first and third directions, and then, as illustrated in FIG. 4, by selecting 10 internal electrodes in the central area located in the center of the width and thickness directions, the average values measured were recorded. In addition, in the case of the average thickness (te) of the internal electrode and the standard deviation (σte) of the internal electrode thickness, after selecting one internal electrode in the central area, the thicknesses were measured at 30 equally spaced points of the internal electrode in the second direction, thereby obtaining the average thickness (te) and standard deviation (σte).

TABLE 1

| Test No. | A (%) | B (%) | A − B (%) | Capacitance | MTTF | Connectivity of Internal Electrode | σte/te |
|---|---|---|---|---|---|---|---|
| 1* | 0 | 0 | 0 | 1 | 1 | 78% | 0.24 |
| 2* | 60 | 15 | 45 | 1.02 | 0.98 | 81% | 0.23 |
| 3 | 70 | 20 | 50 | 1.03 | 1.06 | 86% | 0.18 |
| 4 | 75 | 25 | 50 | 1.19 | 1.16 | 88% | 0.17 |
| 5 | 85 | 30 | 55 | 1.2 | 1.36 | 90% | 0.16 |
| 6 | 90 | 35 | 55 | 1.15 | 1.23 | 92% | 0.16 |
| 7* | 60 | 40 | 20 | 1.08 | 0.97 | 84% | 0.19 |
| 8* | 70 | 55 | 15 | 0.98 | 1.12 | 85% | 0.20 |
| 9* | 80 | 60 | 20 | 0.89 | 1.10 | 84% | 0.21 |

Referring to Table 1 above, when ‘A’ is more than 0% but less than 70% (Test No. 2 and 7), it can be seen that the capacitance may be improved compared to when ‘A’ is 0% (Test No. 1), but the high temperature load lifespan is reduced. In addition, when ‘B’ is more than 35% (Test Nos. 7 to 9), it can be confirmed that the capacitance thereof decreases or the high temperature load lifespan decreases.

On the other hand, in the case in which ‘A’ satisfies 70% or more and ‘B’ satisfies 35% or less (Test No. 3 to 6, each of which satisfies A-B is equal to or greater than 50%, more specifically, is equal to or greater than 50% and equal to or less than 55%), it can be seen that there is a significant improvement in both capacitance and MTTF compared to Test No. 1. In addition, in the case of test numbers 3 to 6, the connectivity of the internal electrodes is 85% or more, and the thickness deviation (σte/te) of the internal electrodes is also low, 0.20 or less, confirming that the smoothness and thickness uniformity of the internal electrodes are excellent. Therefore, it can be confirmed that it may be preferable for ‘A’ to satisfy 70% or more and ‘B’ to satisfy 35% or less.

In addition, when ‘A’ satisfies 75% or more and ‘B’ satisfies 35% or less (Test No. 4 to 6), it can be seen that not only are both capacitance and MTTF improved compared to Test No. 1, but capacitance and MTTF are respectively significantly improved by 15% or more. Therefore, it can be confirmed that it may be more preferable for ‘A’ to satisfy 75% or more and ‘B’ to satisfy 35% or less.

TABLE 2

| Test No. | X | Y | X − Y | Capacitance | MTTF | Connectivity of Internal Electrode | σte/te |
|---|---|---|---|---|---|---|---|
| 1* | 0 | 0 | 0 | 1 | 1 | 78% | 0.24 |
| 2* | 0.0041 | 0.0005 | 0.0036 | 1.02 | 0.98 | 81% | 0.23 |
| 3 | 0.0046 | 0.0005 | 0.0041 | 1.03 | 1.06 | 86% | 0.18 |
| 4 | 0.0067 | 0.0010 | 0.0057 | 1.19 | 1.16 | 88% | 0.17 |
| 5 | 0.0098 | 0.0031 | 0.0067 | 1.2 | 1.36 | 90% | 0.16 |
| 6 | 0.0139 | 0.0041 | 0.0098 | 1.15 | 1.23 | 92% | 0.16 |
| 7* | 0.0140 | 0.0110 | 0.0030 | 1.08 | 0.97 | 84% | 0.19 |
| 8* | 0.0142 | 0.0115 | 0.0027 | 0.98 | 1.12 | 85% | 0.20 |
| 9* | 0.0152 | 0.0127 | 0.0025 | 0.89 | 1.10 | 84% | 0.21 |

Referring to Table 2 above, when X−Y is greater than 0 and less than 0.0041 (Test No. 2, 7 to 9), it can be confirmed that the capacitance decreases or the high temperature load lifespan decreases, as compared to the case in which X−Y is 0 (test number 1).

On the other hand, in cases in which X−Y satisfies 0.0041 or more (test numbers 3 to 6), it can be seen that there is a significant improvement in both capacitance and MTTF compared to test number 1. In addition, in the case of test numbers 3 to 6, the connectivity of the internal electrode is 85% or more, and the thickness deviation (σte/te) of the internal electrode is also small, 0.20 or less. Thus, it can be seen that the smoothness and thickness uniformity of the internal electrode are excellent. Therefore, it can be confirmed that it may be preferable for X−Y to satisfy 0.0041.

Additionally, when X−Y satisfies 0.0057 or more (Test Nos. 4 to 6), it can be seen that not only are both capacitance and MTTF improved compared to test number 1, but also that capacitance and MTTF are respectively significantly improved by 15% or more. Therefore, it can be confirmed that it may be more preferable for X−Y to satisfy 0.0057 or more.

Experimental Example 2

When a region with high Sn content or In content was not disposed at the interface between the dielectric layer and the internal electrode (Comparative Example 1), when a region with high Sn content was placed at the interface between the dielectric layer and the internal electrode (Comparative Example 2), and when a region with high In content was placed at the interface between the dielectric layer and the internal electrode (inventive example); additional experiments were conducted to confirm the differences in structure and effect.

Comparative Example 1 corresponds to test number 1 in Experimental Example 1, and the inventive example corresponds to test number 4 in Experimental Example 1. In Comparative Example 2, a sample chip was manufactured by adding Sn to the internal electrode paste without adding In, in which the In content compared to the Ni powder contained in the internal electrode paste of Test No. 4 and the Sn content compared to the Ni powder contained in the internal electrode paste of Comparative Example 2 were made to be the same.

Figure 11A:
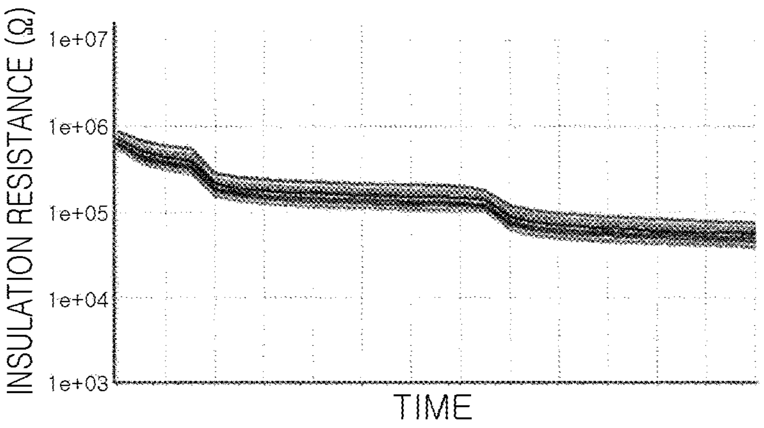
FIG. 11A is a graph measuring insulation resistance for Comparative Example 1.
Figure 11B:
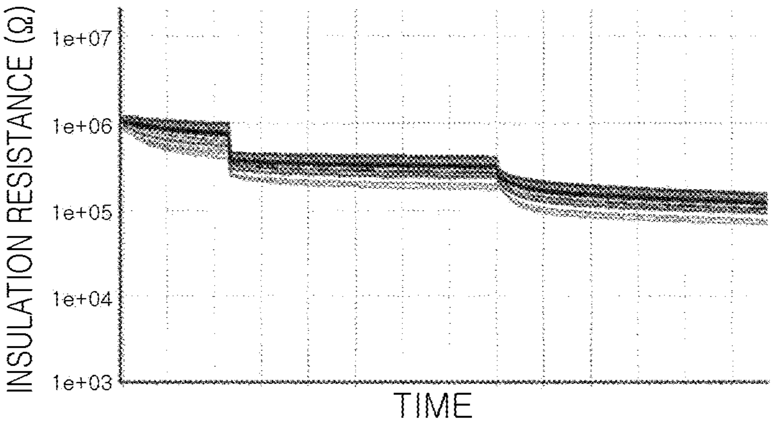
FIG. 11B is a graph for Comparative Example 2.
Figure 11C:
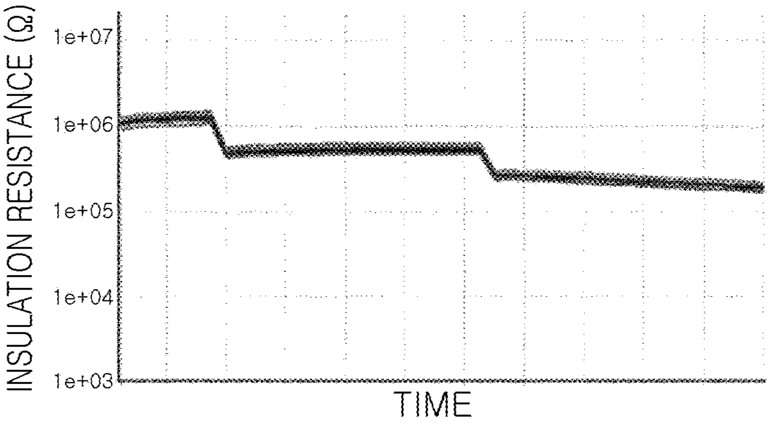
FIG. 11C is a graph measuring insulation resistance for the inventive example.

After preparing 50 samples for each of Comparative Example 1, Comparative Example 2, and Inventive example, a graph of the insulation resistance measured while sequentially applying the conditions of STEP1, STEP2, and STEP3 below is illustrated in the figures. FIG. 11A is a graph for measurement of the insulation resistance for Comparative Example 1, FIG. 11B is a graph for Comparative Example 2, and FIG. 11C is a graph for the inventive example.

STEP 1: Temperature 85° C., humidity 25%, voltage 6.3V, maintained for 1 hour

STEP 2: Temperature 85° C., humidity 25%, voltage 7.56V, maintained for 3.5 hours STEP 3: Temperature 105° C., humidity 25%, voltage 7.56V, maintained for 6 hours Referring to FIGS. 11A, 11B and 11C, it can be seen that in the case of Comparative Example 2 in which Sn was added, the insulation resistance is improved compared to Comparative Example 1, but the distribution of the insulation resistance is not improved. Meanwhile, in the case of the inventive example, it can be seen that not only the insulation resistance is improved compared to Comparative Examples 1 and 2, but also the distribution of the insulation resistance is significantly improved. The spread (CV value) of the insulation resistance of Comparative Example 1 was measured to be 15%, the spread (CV value) of the insulation resistance of Comparative Example 2 was measured to be 18%, and the spread (CV value) of the insulation resistance of the Inventive example was measured to be 7%.

To compare the dielectric grains in the case in which a region with high Sn content or In content is not disposed at the interface between the dielectric layer and the internal electrode (Comparative Example 1) and in the case in which a region with high In content is placed at the interface between the dielectric layer and the internal electrode (inventive example), each sample chip was polished to the center in the second direction to expose the cross section in the first and third directions and then observed using a scanning electron microscope (SEM).

Referring to FIG. 4, the image is scanned to include 100 or more dielectric grains in each of the central area, cover central area, and margin central area, and then, by measuring the average grain size (Ga) of the dielectric grains included in the capacitance forming portion, the average grain size (Gc) of the dielectric grains included in the cover portion, and the average grain size (Gm) of the dielectric grains included in the margin portion, Gc/Ga and Gm/Ga are listed in Table 3 below.

In addition, after preparing 50 samples for each of Comparative Example 1 and Inventive example, capacitance and Dissipation Factor (DF) were measured, and the average and CV values are listed in Table 3 below. Capacitance and Dissipation Factor (DF) were measured using an automatic bridge-type measuring device under the conditions of AC voltage of 1 Vrms and 1 kHz. For the capacitance, capacitance of Comparative Example 1 was set as the standard value '1', and in the case of the inventive example, the relative value to the capacitance of Comparative Example 1 was provided.

TABLE 3

| Classification | Comparative Example 1 | Inventive Example |
|---|---|---|
| Capacitance | 1 | 1.19 |
| Capacitance CV | 4.90% | 1.40% |
| DF | 6.4% | 8.8% |
| DF CV | 6.08% | 2.29% |
| Gc/Ga | 2.08 | 1.28 |
| Gm/Ga | 1.94 | 1.07 |

Referring to Table 3, the capacitance of the inventive example to which In was added is higher than the capacitance of Comparative Example 1, and in detail, it can be seen that the capacitance CV value is significantly improved. In addition, it can be seen that although the DF of the inventive example is slightly higher than DF of Comparative Example 1, the DF CV value is significantly lower.

Figure 12A:
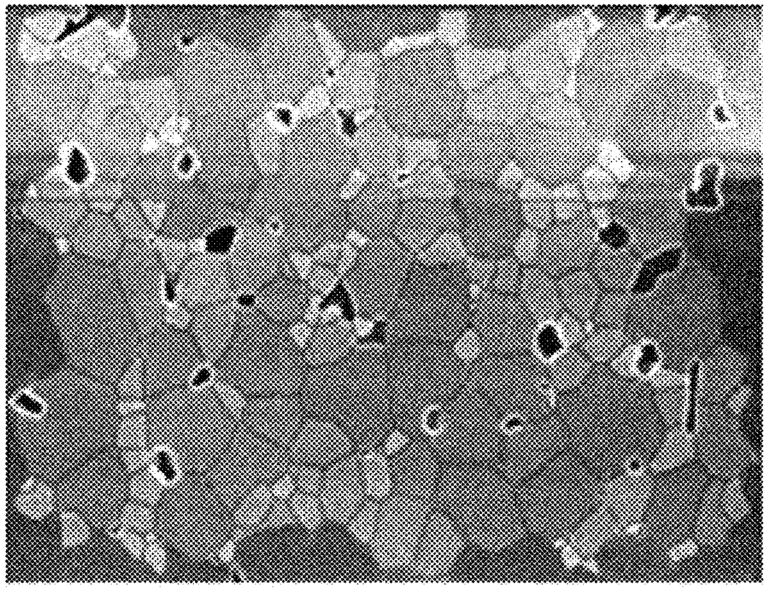
FIG. 12A is an image observing the dielectric grains of the cover portion of Comparative Example 1.
Figure 12B:
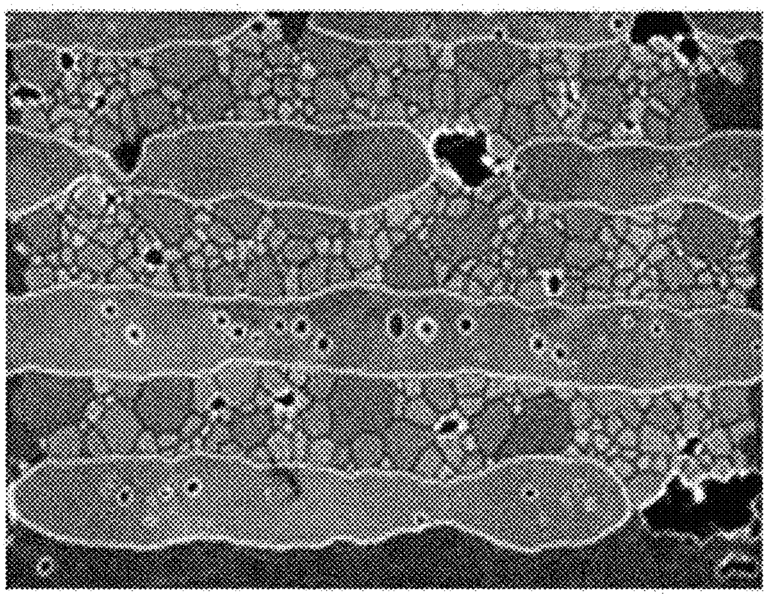
FIG. 12B is an image observing the dielectric grains of the capacitance forming portion of Comparative Example 1.
Figure 13A:
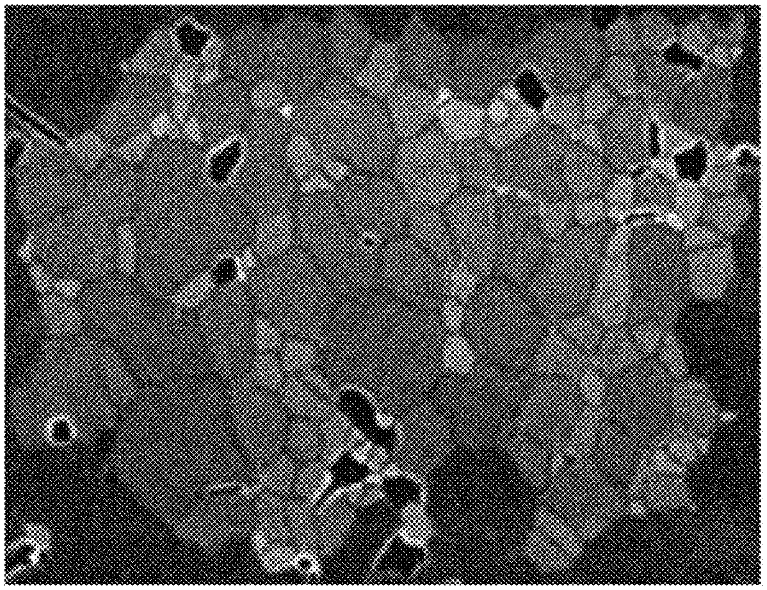
FIG. 13A is an image observing the dielectric grains of the cover portion of the inventive example.
Figure 13B:
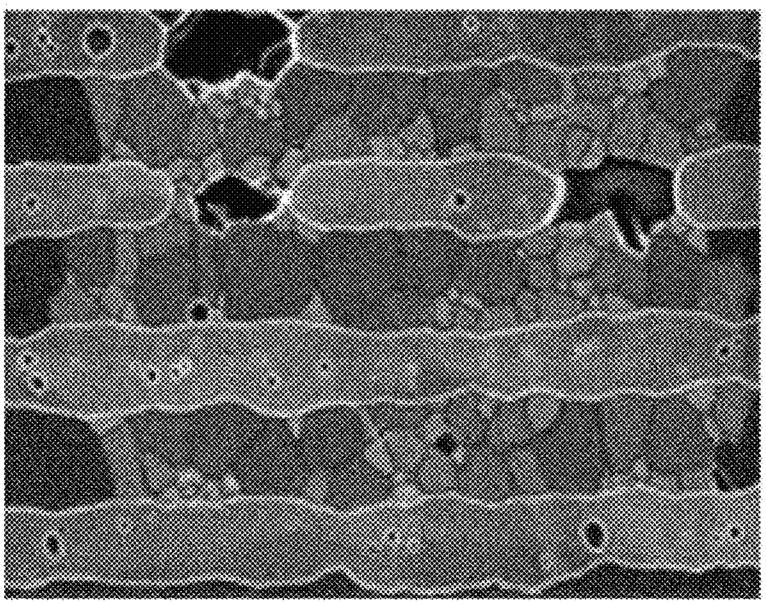
FIG. 13B is an image observing the dielectric grains of the capacitance forming portion of the inventive example.

In cases in which a region with high Sn content or In content is not disposed at the interface between the dielectric layer and the internal electrode (Comparative Example 1) and a region with high In content is placed at the interface between the dielectric layer and the internal electrode (inventive example), images of dielectric grains scanned by SEM are illustrated in FIGS. 12A to 13B. FIG. 12A is an image observing the dielectric crystal grains of the cover portion of Comparative Example 1 and FIG. 12B is an image observing dielectric crystal grains in the capacitance forming portion of Comparative Example 1. FIG. 13A is an image observing the dielectric crystal grains of the cover portion of the inventive example and FIG. 13B is an image observing dielectric crystal grains in the capacitance forming portion of the inventive example.

Referring to Table 3, and FIG. 12A to 13B, in the case of Comparative Example 1, it can be seen that the average grain size (Ga) of the dielectric grains included in the capacitance forming portion is very small compared to the average grain size (Gc) of the dielectric grains included in the cover portion and the average grain size (Gm) of the dielectric grains included in the margin portion. Meanwhile, in the case of the inventive example in which In was added, it can be seen that the average grain size (Ga) of the dielectric grains included in the capacitance forming portion is similar to the average grain size (Gc) of the dielectric grains included in the cover portion and the average grain size (Gm) of the dielectric grains included in the margin portion.

In summary, it can be seen that in the case of the inventive example in which In is added, there is a significant effect of improving both capacitance and MTTF without causing problems such as increased dispersion of capacitance and increased dispersion of insulation resistance.

As set forth above, according to an embodiment, reliability of multilayer electronic components may be improved by controlling the In content in each position within the internal electrode.

Capacitance and high-temperature load lifespan of multilayer electronic components may be improved.

Connectivity of the internal electrodes may be improved and a thickness deviation of the internal electrodes may be reduced.

Dispersion of capacitance and grain size may be suppressed.

Dispersion of insulation resistance may be suppressed.

Although the embodiment of the present disclosure has been described in detail above, the present disclosure is not limited by the above-described embodiment and the accompanying drawings, but is intended to be limited by the appended claims. Accordingly, various types of substitution, modification and change will be possible by those skilled in the art within the scope not departing from the technical spirit of the present disclosure described in the claims, and it is also said that it falls within the scope of the present disclosure.

In addition, the expression 'an/one embodiment' used in the present disclosure does not mean the same embodiment as each other, and is provided to emphasize and explain different unique features. However, an embodiment presented above is not excluded from being implemented in combination with the features of another embodiment. For example, even if a matter described in one detailed embodiment is not described in another embodiment, it may be understood as a description related to another embodiment unless a description contradicts or contradicts the matter in another embodiment.

The terms used in the present disclosure are used to describe only an embodiment, and are not intended to limit the present disclosure. In this case, the singular expression includes the plural expression unless the context clearly indicates otherwise.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:

a body including a plurality of dielectric layers and a plurality of internal electrodes alternately disposed with the plurality of dielectric layers in a first direction; and an external electrode disposed on the body, wherein one of the plurality of internal electrodes includes Ni and In, and in the one of the plurality of internal electrodes, among points 10 nm away from an interface with one of the plurality of dielectric layers, a ratio of points at which a molar ratio of In/(Ni+In) is 0.002 or more is 70% or more, and among central points in the first direction, a ratio of points at which the molar ratio of In/(Ni+In) is 0.002 or more is 35% or less.

2. The multilayer electronic component of claim 1, wherein in the one of the plurality of internal electrodes, among the points 10 nm away from the interface with the one of the plurality of dielectric layers, the ratio of points at which the molar ratio of In/(Ni+In) is 0.002 or more is 70% or more and 90% or less, and among the central points in the first direction, the ratio of points at which the molar ratio of In/(Ni+In) is 0.002 or more is 20% or more and 35% or less.

3. The multilayer electronic component of claim 1, wherein in the one of the plurality of internal electrodes, an average value of the molar ratio of In/(Ni+In) at points 2 nm away from the interface with the one of the plurality of dielectric layers is X, an average value of the molar ratio In/(Ni+In) at the points 10 nm away from the interface with the one of the plurality of dielectric layers is Y, and X−Y is greater than or equal to 0.0041.

4. The multilayer electronic component of claim 3, wherein X is 0.0139 or less.

5. The multilayer electronic component of claim 3, wherein X is 0.0046 or more and 0.0139 or less, and Y is 0.0005 or more and 0.0041 or less.

6. The multilayer electronic component of claim 1, wherein the body has a first surface and a second surface opposing in the first direction, a third surface and a fourth surface connected to the first and second surfaces and opposing in a second direction, and a fifth surface and a sixth surface connected to the first to fourth surfaces and opposing in a third direction, wherein the body includes a capacitance forming portion including the plurality of internal electrodes, and a cover portion disposed on both end surfaces of the capacitance forming portion in the first direction, and margin portions disposed on both end surfaces of the capacitance forming portion in the third direction.

7. The multilayer electronic component of claim 6, wherein $1<Gc/Ga$ and $1<Gm/Ga$ are satisfied, in which Gc is an average grain size of dielectric crystal grains included in the cover portion, Ga is an average grain size of dielectric crystal grains included in the dielectric layer of the capacitance forming portion, and Gm is an average grain size of dielectric crystal grains included in the margin portion.

8. The multilayer electronic component of claim 7, wherein the Ga and Gc satisfy $1<Gc/Ga\leq 1.28$.

9. The multilayer electronic component of claim 8, wherein the Ga and Gm satisfy $1<Gm/Ga\leq 1.07$.

10. The multilayer electronic component of claim 1, wherein at least a portion of In contained in the one of the plurality of internal electrodes is present in an alloy form with Ni.

11. The multilayer electronic component of claim 1, wherein the one of the plurality of dielectric layers includes $Ba(Ti_{1-z}In_z)O_3$ ($0<z<1$).

12. The multilayer electronic component of claim 1, wherein the one of the plurality of internal electrodes includes ceramic particles, and the ceramic particles include In.

13. The multilayer electronic component of claim 12, wherein an In content on surfaces of the ceramic particles is 0.4 at % or more.

14. The multilayer electronic component of claim 1, wherein the one of the plurality of internal electrodes includes a plurality of conductive portions and a disconnection portion disposed between adjacent conductive portions, and connectivity of the one of the plurality of internal electrodes, which is a ratio of a sum of lengths of the plurality of conductive portions to a total length of the one of the plurality of internal electrodes, is 85% or more.

15. The multilayer electronic component of claim 1, wherein $\sigma te/te$ is 0.2 or less, in which te is an average thickness of the one of the plurality of internal electrodes and $\sigma te$ is a standard deviation of a thickness of the one of the plurality of internal electrodes.

16. A multilayer electronic component comprising:

a body including a plurality of dielectric layers and a plurality of internal electrodes alternately disposed with the plurality of dielectric layers in a first direction; and an external electrode disposed on the body, wherein one of the plurality of internal electrodes includes Ni and In, and in the one of the plurality of internal electrodes, an average value of a molar ratio of In/(Ni+In) at points 2 nm away from an interface with one of the plurality of dielectric layers is X, an average value of a molar ratio of In/(Ni+In) in regions 10 nm apart from the interface with the one of the plurality of dielectric layers is Y, and X−Y is greater than or equal to 0.0041.

17. The multilayer electronic component of claim 16, wherein X is 0.0139 or less.

18. The multilayer electronic component of claim 16, wherein X is 0.0046 or more and 0.0139 or less, and Y is 0.0005 or more and 0.0041 or less.

19. The multilayer electronic component of claim 16, wherein at least a portion of In contained in the one of the plurality of internal electrodes is present in an alloy form with Ni.

20. The multilayer electronic component of claim 19, wherein the one of the plurality of internal electrodes includes ceramic particles, and the ceramic particles contain In.

21. A multilayer electronic component comprising:

a body including a plurality of dielectric layers and a plurality of internal electrodes alternately disposed with the plurality of dielectric layers in a first direction; and an external electrode disposed on the body, wherein one of the plurality of internal electrodes includes Ni and In, and in the one of the plurality of internal electrodes, a ratio of points at which a molar ratio of In/(Ni+In) is 0.002 or more among points 10 nm away from an interface with one of the plurality of dielectric layers is 50% or more, as compared to a ratio of points at which the molar ratio of In/(Ni+In) is 0.002 or more among central points in the first direction.

22. The multilayer electronic component of claim 21, wherein the ratio of points at which the molar ratio of In/(Ni+In) is 0.002 or more among the points 10 nm away from the interface with one of the plurality of dielectric layers is 55% or less, as compared to the ratio of points at which the molar ratio of In/(Ni+In) is 0.002 or more among the central points in the first direction.

23. The multilayer electronic component of claim 21, wherein in the one of the plurality of internal electrodes, an average value of the molar ratio of In/(Ni+In) at points 2 nm away from the interface with the one of the plurality of dielectric layers is X, an average value of the molar ratio In/(Ni+In) at the points 10 nm away from the interface with the one of the plurality of dielectric layers is Y, and X−Y is greater than or equal to 0.0041.

24. The multilayer electronic component of claim 21, wherein the body has a first surface and a second surface opposing in the first direction, a third surface and a fourth surface connected to the first and second surfaces and opposing in a second direction, and a fifth surface and a sixth surface connected to the first to fourth surfaces and opposing in a third direction, the body includes a capacitance forming portion including the plurality of internal electrodes, and a cover portion disposed on both end surfaces of the capacitance forming portion in the first direction, and margin portions disposed on both end surfaces of the capacitance forming portion in the third direction, and $1<Gc/Ga$ and $1<Gm/Ga$ are satisfied, in which Gc is an average grain size of dielectric crystal grains included in the cover portion, Ga is an average grain size of dielectric crystal grains included in the dielectric layer of the capacitance forming portion, and Gm is an average grain size of dielectric crystal grains included in the margin portion.

25. The multilayer electronic component of claim 24, wherein the Ga and Gc satisfy $1<Gc/Ga\leq 1.28$.

26. The multilayer electronic component of claim 24, wherein the Ga and Gm satisfy 1<Gm/Ga≤1.07.

27. A multilayer electronic component comprising:

a body including a plurality of dielectric layers and a plurality of internal electrodes alternately disposed with the plurality of dielectric layers in a first direction; and an external electrode disposed on the body, wherein one of the plurality of internal electrodes includes Ni and In, a content of In with respect to a content of Ni in a first region of the one of the plurality of internal electrodes is greater than a content of In with respect to a content of Ni in a central region of the one of the plurality of internal electrodes in the first direction, the first region being disposed between the central region of the one of the plurality of internal electrodes and an interface between the one of the plurality of internal electrodes and one of the plurality of dielectric layers, the body has a first surface and a second surface opposing in the first direction, a third surface and a fourth surface connected to the first and second surfaces and opposing in a second direction, and a fifth surface and a sixth surface connected to the first to fourth surfaces and opposing in a third direction, the body includes a capacitance forming portion including the plurality of internal electrodes, and a cover portion disposed on both end surfaces of the capacitance forming portion in the first direction, and margin portions disposed on both end surfaces of the capacitance forming portion in the third direction, 1<Gc/Ga and 1<Gm/Ga are satisfied, in which Gc is an average grain size of dielectric crystal grains included in the cover portion, Ga is an average grain size of dielectric crystal grains included in the dielectric layer of the capacitance forming portion, and Gm is an average grain size of dielectric crystal grains included in the margin portion, and the one of the plurality of internal electrodes includes ceramic particles, and the ceramic particles include In.

28. The multilayer electronic component of claim 27, wherein the Ga and Gc satisfy 1<Gc/Ga≤1.28.

29. The multilayer electronic component of claim 27, wherein the Ga and Gm satisfy 1<Gm/Ga≤1.07.

30. The multilayer electronic component of claim 27, wherein the Ga, Gm, and Gc satisfy 1<Gc/Ga≤1.28 and 1<Gm/Ga≤1.07.

* * * * *